(12) United States Patent
Rolfs

(10) Patent No.: US 7,739,657 B2
(45) Date of Patent: Jun. 15, 2010

(54) PIPELINE ARCHITECTURE FOR USE WITH NET-CENTRIC APPLICATION PROGRAM ARCHITECTURES

(75) Inventor: Damon Michael Rolfs, Seattle, WA (US)

(73) Assignee: Accenture Global Services GmbH, Schaffhausen (CH)

( * ) Notice: Subject to any disclaimer, the term of this patent is extended or adjusted under 35 U.S.C. 154(b) by 1107 days.

(21) Appl. No.: 11/228,683

(22) Filed: Sep. 16, 2005

(65) Prior Publication Data

US 2006/0064573 A1    Mar. 23, 2006

Related U.S. Application Data

(62) Division of application No. 09/859,765, filed on May 17, 2001, now Pat. No. 6,971,001.

(51) Int. Cl.
G06F 9/44 (2006.01)
G06F 3/00 (2006.01)

(52) U.S. Cl. ............... 717/106; 719/314; 719/315

(58) Field of Classification Search ............ 713/1, 713/2; 717/139, 170; 709/203, 217; 706/50
See application file for complete search history.

(56) References Cited

U.S. PATENT DOCUMENTS

| | | | |
|---|---|---|---|
| 4,996,662 A | 2/1991 | Cooper et al. ............... 364/900 |
| 5,727,147 A | 3/1998 | Van Hoff ............... 395/200.3 |
| 6,058,389 A * | 5/2000 | Chandra et al. ............... 707/1 |
| 6,088,659 A * | 7/2000 | Kelley et al. ............... 702/62 |
| 6,199,196 B1 | 3/2001 | Madany et al. ............... 717/2 |
| 6,253,369 B1 * | 6/2001 | Cloud ............... 715/5 |
| 6,256,676 B1 | 7/2001 | Taylor et al. ............... 709/246 |
| 6,272,674 B1 | 8/2001 | Holiday ............... 717/1 |
| 6,279,030 B1 | 8/2001 | Britton et al. ............... 709/203 |
| 6,282,531 B1 | 8/2001 | Haughton et al. ............... 706/50 |
| 6,308,317 B1 | 10/2001 | Wilkinson et al. ............... 717/5 |
| 6,393,605 B1 | 5/2002 | Loomans ............... 717/121 |

(Continued)

OTHER PUBLICATIONS

Geary, D., "Apache Struts: a Web application framework," Java Report, pp. 1-5, Nov. 2000, ISSN: 1086-4660, XP002279161, http://www.javareport.com, Sigs Publications, New York, NY.

(Continued)

Primary Examiner—Hyung S Sough
Assistant Examiner—Tuan Dao
(74) Attorney, Agent, or Firm—Brinks Hofer Gilson & Lione

(57) ABSTRACT

A robust toolkit provides facilities that can be assembled in a modular manner to specify the fundamental architecture of a net-centric application. A bootstrapping process assembles various facilities within the architecture. A configuration facility defines an API for getting properties that can be defined in any number of different types of sources. A factory de-couples how a resource is produced from where the resource is used. A selector framework applies standard query language to contexts other than querying a database. A pipeline architecture defines a model view controller-like framework for a processing pipeline. Selectors are used to specify when certain portions of a Web conversation should be made available to a user. An authorization facility associates permissions with a user to specify which portions of an application a user is authorized to use.

26 Claims, 24 Drawing Sheets

U.S. PATENT DOCUMENTS

| | | | |
|---|---|---|---|
| 6,470,494 B1 | 10/2002 | Chan et al. | 717/166 |
| 6,490,578 B1* | 12/2002 | Burkhard | 707/3 |
| 6,635,089 B1 | 10/2003 | Burkett et al. | 715/513 |
| 6,636,855 B2* | 10/2003 | Holloway | 701/10 |
| 6,643,682 B1* | 11/2003 | Todd et al. | 709/202 |
| 6,675,381 B1 | 1/2004 | Yamaguchi | 717/168 |
| 6,721,777 B1 | 4/2004 | Sharma | 709/101 |
| 6,748,591 B1 | 6/2004 | Lewallen | 717/170 |
| 6,766,361 B1 | 7/2004 | Venigalla | 709/217 |
| 6,971,001 B1 | 11/2005 | Rolfs | 713/1 |
| 7,085,814 B1* | 8/2006 | Gandhi et al. | 709/208 |
| 7,092,984 B2* | 8/2006 | Nishigaya | 719/201 |
| 2004/0015954 A1 | 1/2004 | Tuerke et al. | 717/173 |
| 2006/0064574 A1 | 3/2006 | Rolfs | 713/1 |
| 2008/0052727 A1* | 2/2008 | Todd | 719/313 |

OTHER PUBLICATIONS

Seacord, R.,C., Wallnau, K., Robert, J., Dorda, S.C., Hissam, S.A., "Custom vs. Off-The-Shelf Architecture," Enterprise Distributed Object Computing Conference, 1999, EDOC '99 Proceedings, Third International Mannheim, Germany Sep. 27-30, 1999, Piscataway, NJ, USA, IEEE, US.

Batteram, H.J., Bakker, J-L., Verhoosel, J.P.C., Diakov, N.K., "Design and Implementation of the MESH Services Platform," Telecommunications Information Networking Architecture Conference Proceedings, 1999, TINA '99 Oahu, HI USA Apr. 12-15, 1999, Piscataway, NJ USA, IEEE, US 1998.

Friesenhahn, B., "Autoconf Makes for Portable Software," BYTE, McGraw-Hill, St. Peterborough, U.S. vol. 22, No. 11, pp. 45-46, Nov. 1, 1997.

Just, C., Bierbaum, A., Hartling, P., Meinert, K., Cruz-Neira, C., Baker, A., "VjControl: An Advanced Configuration Management Tool for VR Juggler Applications," Proceedings IEEE 2001 Virtual Reality (VR) Yokohama, Japan, Mar. 13-17, 2001, Proceedings IEEE Virtual Reality (VR) Los Alamitos, CA IEEE Comp. Soc. US.

"Java Dynamic Class Loader," IBM Technical Disclosure Bulletin, Nov. 1, 1996, vol. 39, No. 11, pp. 107-108.

European Search Report for Application No. 06076312.5-2211 dated Nov. 17, 2006, 10 pgs.

Canadian Office Action issued Jan. 29, 2010 in corresponding Canadian Patent Application No. 2,551,059 (2 pgs.).

IBM, "Design and Implement Servlets, JSPs, and EJBs for IBM WebSphere Application Server," Aug. 2000, IBM Corp. pp. 1-177.

IBM, "Design and Implement Servlets, JSPs, and EJBs for IBM WebSphere Application Server," Aug. 2000, IBM Corp., sec. Contents, pp. i-xi.

Netscape Application Builder, "User's Guide," 1999, Netscape Communications Corp., Chapters 1-10, 254 pages.

Netscape Application Builder, "User's Guide," 1999, Netscape Communications Corp., sec. Contents, 12 pages.

* cited by examiner

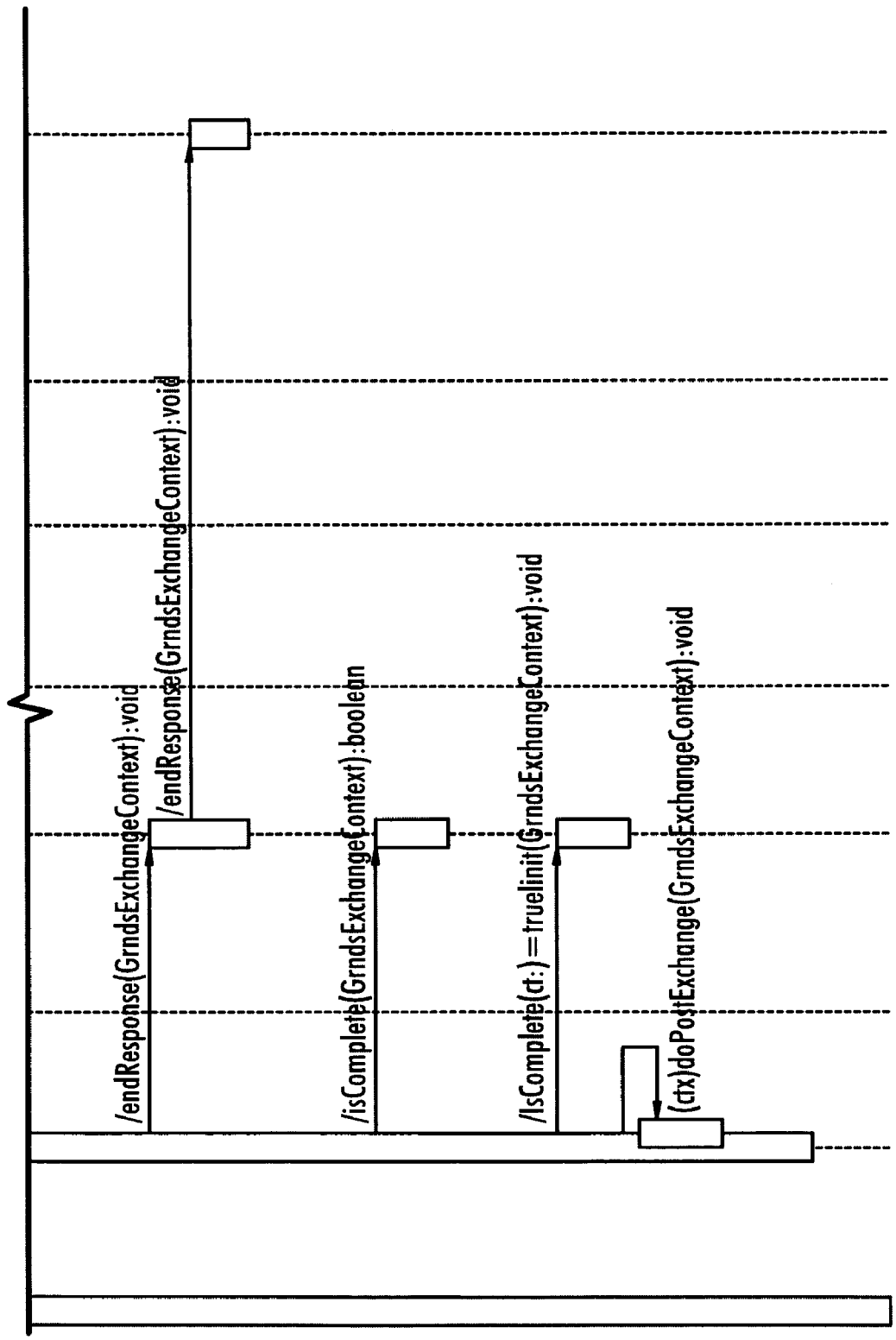

PIPELINE ARCHITECTURE FOR USE WITH NET-CENTRIC APPLICATION PROGRAM ARCHITECTURES

PRIORITY INFORMATION

This application is a divisional of U.S. patent application Ser. No. 09/859,765 filed on May 17, 2001, now U.S. Pat. No. 6,971,001 which is herein incorporated by reference in its entirety.

FIELD OF THE INVENTION

The invention relates to a toolkit for specifying net-centric application program architectures. More specifically, the invention relates to various general and reusable components, facilities, and frameworks for robustly structuring a net-centric application program in a modular manner.

BACKGROUND OF THE INVENTION

Java 2 Platform, Enterprise Edition (J2EE) is a platform that enables solutions for developing, deploying and managing multi-tier net-centric or server-centric applications. J2EE utilizes Java 2 Platform, Standard Edition to extend a Java platform to the enterprise level.

Conventionally, J2EE-based products have typically been implemented as "one-off" implementations on top of the J2EE platform. A "one-off" implementation refers to a solution that is focused on a specific set of requirements, with little or no thought about reuse across other problem domains. Conventional J2EE-based one-off application architecture implementations typically include facilities for logging errors, setting up configuration behind the application, and structuring the application in accordance with the commonly known framework or pattern referred to as the model view controller.

As is well-known in the art, the model view controller framework includes three layers that work together: (1) the view layer, which describes how information is presented to an application user; (2) the controller layer, which interprets how user actions are translated into business activities or work within the application; and (3) the model layer, which performs complicated computational tasks such as working with a database. Activities and Presentations define boundary points in the Model-View Controller framework. Activities define the boundary between the Controller and the Model, while Presentations define the boundary between the Controller and the View. These boundary points define what is commonly referred to as separation of concerns.

An alternative structural framework relative to the model view controller is message oriented middleware. Message oriented middleware based applications are essentially hooked together through a series of work queues for sending messages from one processing component to another processing component through these queues. The work queues typically include some type of message send and message receive mechanisms. Message oriented middleware tasks are performed by exchanging messages in an asynchronous manner, which is in contrast to the synchronous nature of the remote procedure call paradigm. Although the remote procedure call paradigm has been widely used, the message oriented middleware approach is beginning to be used more often than it has in the past. The message oriented middleware structural framework facilitates managing the work performed by such a series of queues by creating a processing pipeline in which work is performed on messages that are passed from one processing component to another processing component. Passing messages or work units between these processing components is managed through a messaging pipeline.

Unfortunately, conventional one-off J2EE-based, and other conventional net-centric application, program implementations tend to be fairly rigidly configured and not well suited to component and/or facility re-use, ease of maintenance, and future modification.

Accordingly, there is a need for a robust toolkit that provides facilities that can be assembled in a modular manner thereby enabling an application architect to specify the fundamental architecture of a net-centric application program including specifying which facilities the architect wants, and which facilities the architect does not want, to use for a particular net-centric application program.

BRIEF SUMMARY OF THE INVENTION

The invention relates to a robust toolkit or set of components for defining a net-centric application program architecture that preferably lies on top of the Java 2 Enterprise Edition, commonly known as the J2EE. A toolkit or set of components in accordance with illustrative embodiments of the invention may be separated into various major components or aspects for purposes of discussion, including: (1) the bootstrapping process; (2) the configuration facility; (3) the factory; (4) selectors; (5) the pipeline architecture; (6) Web application control flow; and (7) the authorization facility.

A bootstrapping process in accordance with illustrative embodiments of the invention may allow a project architect to use a declarative style for assembling various facilities within the architecture and initializing them. The bootstrapping process may be driven by an XML document at run time. The XML document could be edited to set up the architecture differently without having to recompile and/or rebuild the system. The bootstrapping process can be extended by adding application-specific bootstrap tasks.

A toolkit and program architecture in accordance with illustrative embodiments of the invention may include a configuration facility having a single API or method for getting properties that can be defined in any number of different sources. One or more of the sources could be: one or more properties files on one or more file systems; environment variables within one or more computers at run time; data within one or more databases; or any other number of suitable permutations and/or combinations of suitable sources. A configuration facility in accordance with illustrative embodiments of the invention enables an architect to assemble any number of these sources behind the configuration facility API so that application developers can go against a single API. The application developers, therefore, do not need to know where the sources are located. Through the bootstrapping process a project architect can assemble the configuration sources that the architect wants to provide to application developers. Any number of these configuration sources may be assembled into or, stated differently, included in, the configuration facility. The declarative style of the bootstrapping process advantageously facilitates modification of configuration data.

A factory in accordance with illustrative embodiments of the invention may allow a developer to de-couple how a resource is produced from where the resource is used. This de-coupling provides significant benefits for maintaining an application program over a long period of time and facilitating making changes to the program. A factory in accordance with illustrative embodiments of this invention defines a simple API that application developers program in order to produce references to resources. How these references are produced can be plugged in according to any number of various strategies. This is unlike conventional factories, which typically are more rigid and suited to one particular type of a reference-producing scenario.

The factory facility provides a standard way of coupling subsystems and increasing the modularity of an application program thereby facilitating modification of the program. Advantageously, the factory facility may allow for moving access from local to distributed without breaking any higher level parts of an application. A factory in accordance with illustrative embodiments of the invention can be used to lower network connectivity-associated overhead by substituting a lighter weight co-located component for a heavier-weight distributed component, such as an Enterprise Java Bean ("EJB").

A selector framework in accordance with illustrative embodiments of the invention may allow standard query language to be applied in contexts other than querying a database. The selector framework advantageously may allow for defining context-specific ways of evaluating identifiers within a selector expression. The selector framework may allow application of these types of expressions in different contexts that typically will have different types of identifiers. This is unlike the use of SQL expressions in the database context wherein the identifiers are assumed to be database fields. A selector facility in accordance with illustrative embodiments of the invention provides an engine for evaluating selector expressions and preferably offers a way to extend the selector framework to a number of different contexts.

A pipeline architecture in accordance with illustrative embodiments of the invention enables an architect to define a model view controller-like framework for a processing pipeline or message oriented middleware-type application. An application architect and/or developer can specify how each processing component does work through a series of fine-grained activities. The specified activities can be assembled together into an activity plan. There could be several different aspects of an activity plan for covering the basic steps that are commonly performed by processing components. For instance, processing of messages, processing of elements within a message, how output is produced, how errors are handled, how redelivered messages are handled, and the like.

The pipeline architecture provides a structured manner for specifying these fine-grained activities. The pipeline architecture provides a significant benefit by allowing developers to focus on writing these fine-grained activities. Developers can then re-use these fine-grained activities in many different types of plans. This in turn significantly simplifies development, testing, integration, maintenance, and modification of an application built in accordance with various inventive pipeline architecture principles.

Within a Web application, there are often conversations, or portions of the application, that should follow a very specific control flow, such as going from page A to page B to page C in only that specific order. Web application developers frequently confront this situation, namely, controlling the continuity of conversations within Web applications. The term conversation refers to a cohesive set of pages that act together to perform some unit of work, such as purchasing an airline ticket or editing user profile information.

An architecture in accordance with illustrative embodiments of the invention provides a way of controlling conversation flow through the use of one or more selectors. Within the Web application framework context, a selector is a logical expression that makes certain portions of a conversation available when certain specified conditions have been met. The selectors-based approach provides a significant advantage relative to conventional techniques for controlling web application flow because the selectors-based approach is decentralized and relatively lightweight. Selectors advantageously provide a simpler way to control the continuity of conversations relative to conventional techniques that often require modeling an application as a finite state machine, which is a relatively complex task.

An authorization facility in accordance with illustrative embodiments of the invention may be used for associating permissions with a user to specify which portions of an application a user is authorized to use and which portions of the application the user is not authorized to use. The authorization facility is preferably integrated directly into a Web application and used to associate required permissions that are needed to enter certain Web conversations. Advantageously, the authorization facility can associate requisite permissions at many levels of detail ranging from specific fine-grained parts of an application through larger views of the application. The authorization facility may allow for declaratively associating, through a configuration approach, a required permission to enter a conversation (or a particular page within a conversation) within a Web application. Advantageously, these associated requisite permissions can be modified by changing declarative definitions. These declarative definitions can be implemented in XML or any other suitable format. The need to edit, compile, and re-build Java code in order to change authorization permissions for the application and/or various parts of the application can, therefore, be avoided, thereby facilitating maintenance and/or modification of the authorization permissions.

BRIEF DESCRIPTION OF THE DRAWINGS

FIG. 19C is a third portion of the UML dynamic sequence diagram depicted in FIG. 19A.

DETAILED DESCRIPTION OF THE INVENTION

I. Introduction

The invention relates to a robust toolkit or set of components for defining a net-centric application program architecture that preferably lies on top of the Java 2 Enterprise Edition, commonly known as the J2EE. A toolkit or set of components in accordance with illustrative embodiments of the invention may be separated into various major components or aspects for purposes of discussion. These major components or aspects will be presented herein in an order in which they build on one another to the extent possible. These components or aspects are presented below generally in the following order: (1) the bootstrapping process; (2) the configuration facility; (3) the factory; (4) selectors; (5) the pipeline architecture; (6) Web application control flow; and (7) the authorization facility.

Before discussing these major components or aspects in detail, a brief introductory description of these aspects or components will be provided. The bootstrapping process may allow a project architect to specify in a declarative manner which facilities should be included within a net-centric application program architecture. The configuration facility provides a mechanism for plugging-in any number of various types of configuration sources. The factory can be used for producing references to any number of different types of resources and for de-coupling how the resource references are produced from the context in which the resource references are used. Selectors are essentially logical expressions that can be used in various contexts, such as controlling conversation flow within a Web application. The pipeline architecture can be used for defining a model view controller-like framework in a message oriented middleware-type context. The authorization facility can be integrated into a Web application and used for associating permissions with a user of the Web application program thereby specifying which portions of the program a user is authorized to use and which portions the user is not authorized to use.

II. Exemplary Distributed Computing Environment

Figure 1:
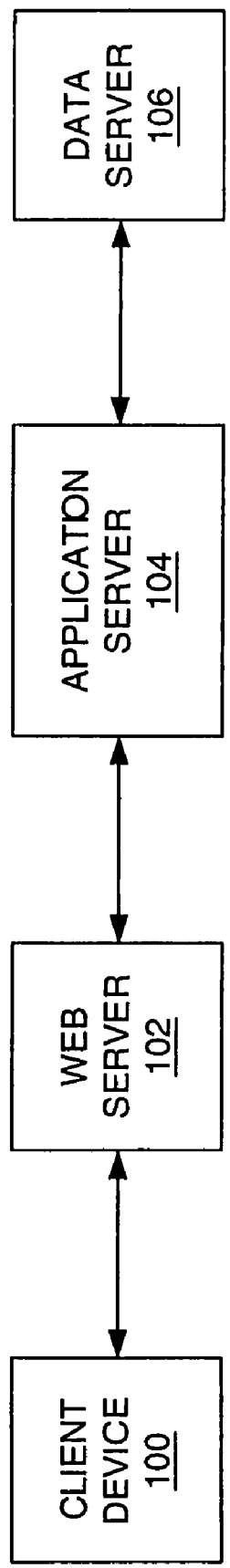
FIG. 1 depicts an exemplary distributed computing environment in which various aspects of the present invention may be embodied.

Various aspects of the present invention may be embodied on a distributed computer system, such as the system shown in FIG. 1. Any of client device 100, web server 102, application server 104, and data server 106 could be a computer, such as computer 200 depicted in FIG. 2. As will be apparent, although only a single client device 102, application server 104, and data server 106 are depicted in FIG. 1, a distributed computer system could include multiple loosely coupled instances of any of these distributed computer system components. Client device 100 could be a desktop PC, a smart phone, a handheld computer and/or the like. In accordance with certain inventive principles described in more detail below, a web application architecture framework could define a model view controller framework such that the view and the controller are implemented on web server 102 via Java Server Pages (JSPs) and Java servlets, respectively; and the model is implemented on the application server 104 via Enterprise JavaBeans (EJB) and/or business domain objects.

Figure 2:
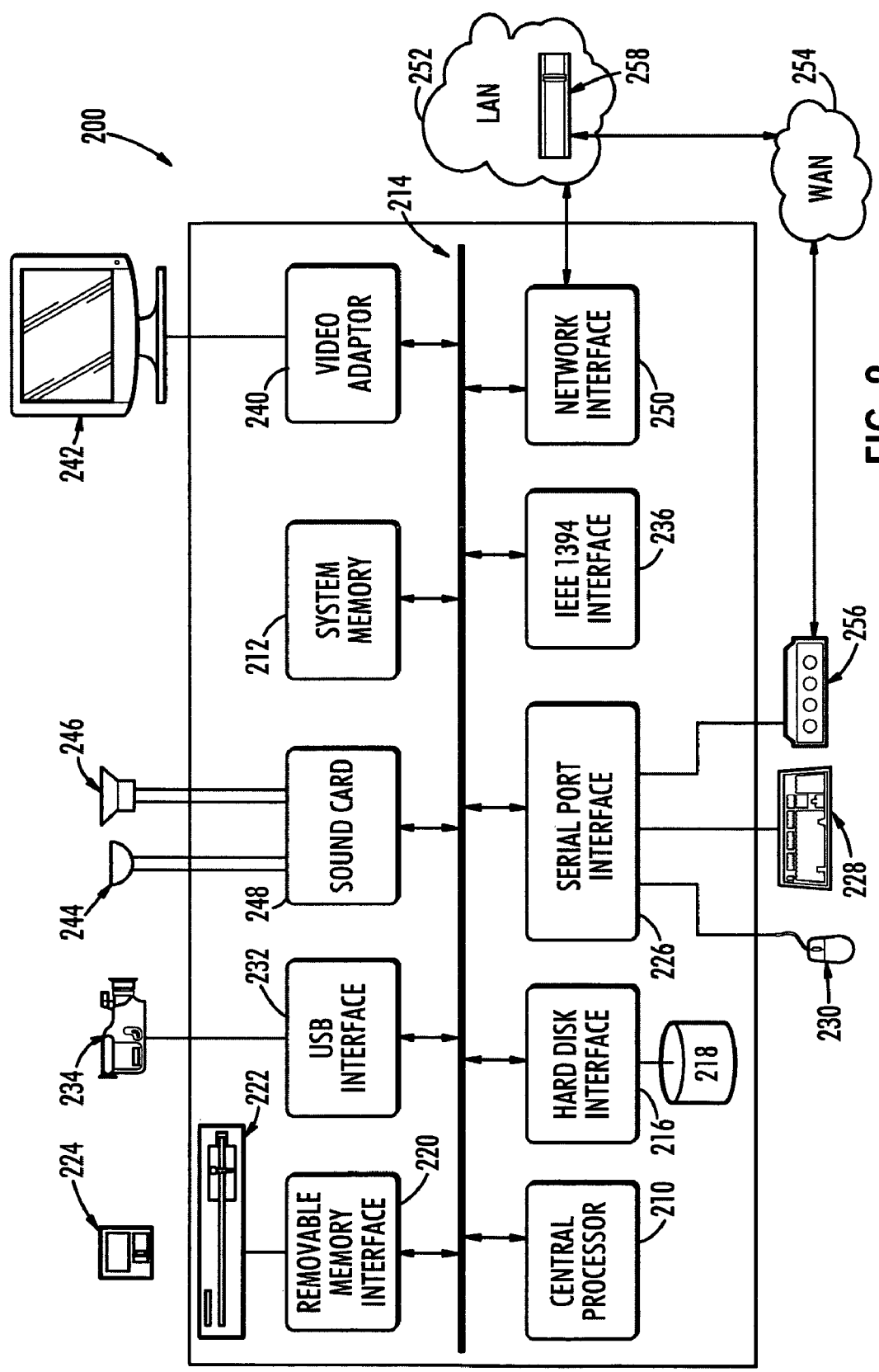
FIG. 2 depicts an exemplary computer system in which various aspects of the present invention may be embodied.

Referring to FIG. 2, computer 200 includes a central processor 210, a system memory 212 and a system bus 214 that couples various system components including the system memory 212 to the central processor unit 210. System bus 214 may be any of several types of bus structures including a memory bus or memory controller, a peripheral bus, and a local bus using any of a variety of bus architectures. The structure of system memory 212 is well known to those skilled in the art and may include a basic input/output system (BIOS) stored in a read only memory (ROM) and one or more program modules such as operating systems, application programs and program data stored in random access memory (RAM).

Computer 200 may also include a variety of interface units and drives for reading and writing data. In particular, computer 200 includes a hard disk interface 216 and a removable memory interface 220 respectively coupling a hard disk drive 218 and a removable memory drive 222 to system bus 214. Examples of removable memory drives include magnetic disk drives and optical disk drives. The drives and their associated computer-readable media, such as a floppy disk 224 provide nonvolatile storage of computer readable instructions, data structures, program modules and other data for computer 200. A single hard disk drive 218 and a single removable memory drive 222 are shown for illustration purposes only and with the understanding that computer 200 may include several of such drives. Furthermore, computer 200 may include drives for interfacing with other types of computer readable media.

A user can interact with computer 200 with a variety of input devices. FIG. 2 shows a serial port interface 226 coupling a keyboard 228 and a pointing device 230 to system bus 214. Pointing device 228 may be implemented with a mouse, track ball, pen device, or similar device. Of course one or more other input devices (not shown) such as a joystick, game pad, satellite dish, scanner, touch sensitive screen or the like may be connected to computer 200.

Computer 200 may include additional interfaces for connecting devices to system bus 214. FIG. 2 shows a universal serial bus (USB) interface 232 coupling a video or digital camera 234 to system bus 214. An IEEE 1394 interface 236 may be used to couple additional devices to computer 200. Furthermore, interface 236 may be configured to operate with particular manufacturers' interfaces such as FireWire developed by Apple Computer and i.Link developed by Sony. Input devices may also be coupled to system bus 214 through a parallel port, a game port, a PCI board or any other interface used to couple and input device to a computer.

Computer 200 also includes a video adapter 240 coupling a display device 242 to system bus 214. Display device 242 may include a cathode ray tube (CRT), liquid crystal display (LCD), field emission display (FED), plasma display or any other device that produces an image that is viewable by the user. Additional output devices, such as a printing device (not shown), may be connected to computer 200.

Sound can be recorded and reproduced with a microphone 244 and a speaker 266. A sound card 248 may be used to couple microphone 244 and speaker 246 to system bus 214. One skilled in the art will appreciate that the device connections shown in FIG. 2 are for illustration purposes only and that several of the peripheral devices could be coupled to system bus 214 via alternative interfaces. For example, video camera 234 could be connected to IEEE 2394 interface 236 and pointing device 230 could be connected to USB interface 232.

Computer 200 can operate in a networked environment using logical connections to one or more remote computers or other devices, such as a server, a router, a network personal computer, a peer device or other common network node, a wireless telephone or wireless personal digital assistant. Computer 200 includes a network interface 250 that couples system bus 214 to a local area network (LAN) 252. Networking environments are commonplace in offices, enterprise-wide computer networks and home computer systems.

A wide area network (WAN) 254, such as the Internet, can also be accessed by computer 200. FIG. 2 shows a modem unit 256 connected to serial port interface 226 and to WAN 254. Modem unit 256 may be located within or external to computer 200 and may be any type of conventional modem such as a cable modem or a satellite modem. LAN 252 may also be used to connect to WAN 254. FIG. 2 shows a router 258 that may connect LAN 252 to WAN 254 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 200 can be operated in a client-server configuration to permit a user to retrieve web pages from a web-based server. Computer 200 could also be operated in a more loosely coupled distributed computing environment. Furthermore, any of various conventional web browsers can be used to display and manipulate data on web pages.

The operation of computer 200 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

III. Bootstrapping Process

In accordance with illustrative embodiments of the invention, a bootstrapping process may allow a project architect to use a declarative style for assembling various facilities within the architecture and initializing them. A set of facilities may be provided. Generally, each facility is focused on a particular problem, such as logging, configuration information, producing references to other components, or managing the life cycle of a facility.

In accordance with illustrative embodiments of the invention, a bootstrapping process may be driven by an XML document at run time. Such an XML document could be edited to set up the architecture differently without having to recompile and/or rebuild the system. Alternatively, the declarative approach to the bootstrapping process could be encapsulated within a specific class that would need to be edited and re-built to change a particular strategy.

Figure 3:
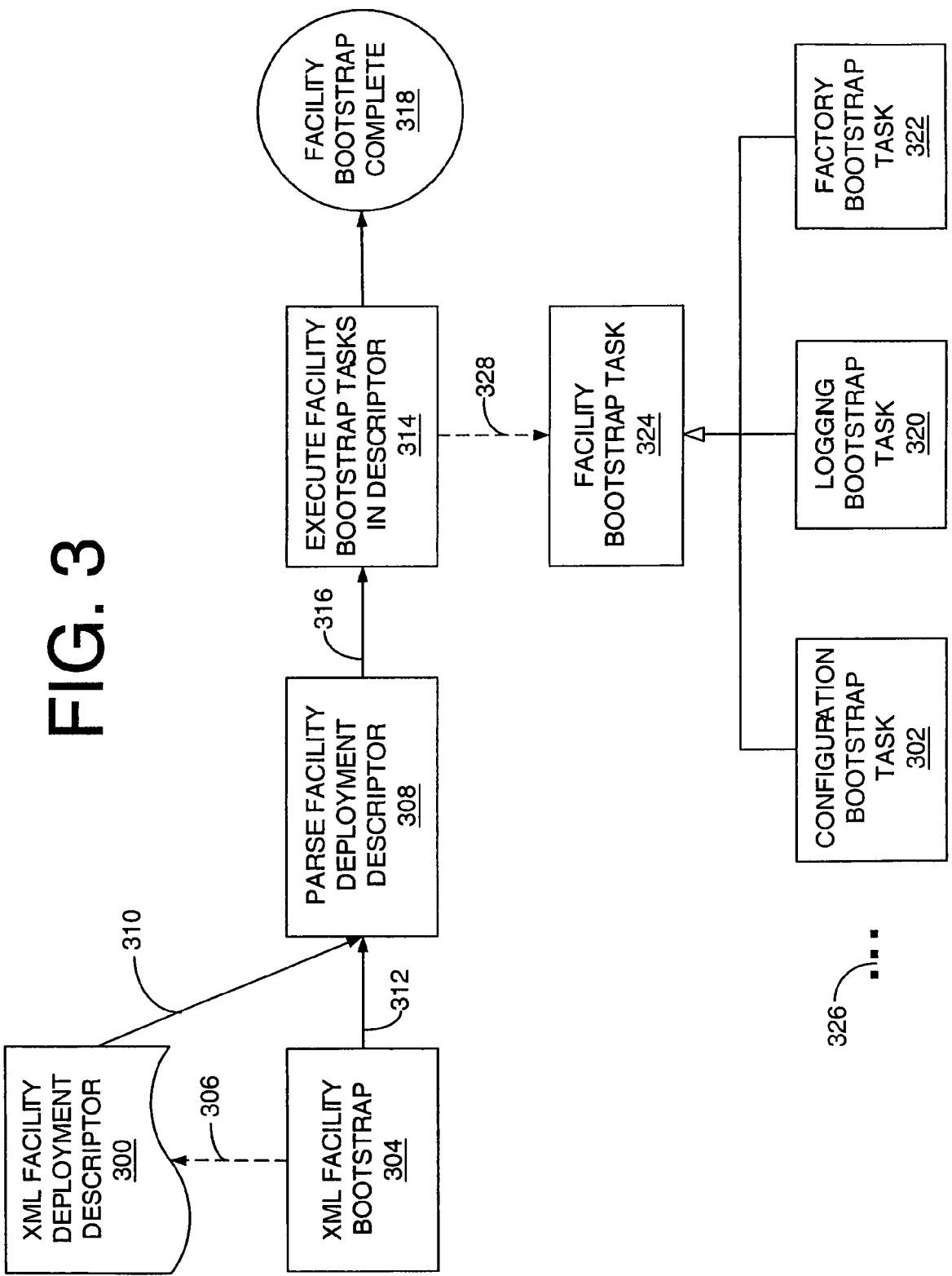
FIG. 3 depicts various components and aspects of a bootstrapping process in accordance with illustrative embodiments of the invention.

FIG. 3 depicts various components and aspects of a bootstrapping process in accordance with illustrative embodiments of the invention. XML facility deployment descriptor 300 is an XML document that details the facilities and their components and how those facilities should be set up for a particular application. The XML facility deployment descriptor 300 preferably contains elements for multiple facilities, such as logging, life-cycle management, authorization, and factory. The XML facility deployment descriptor 300 also preferably contains sub-elements that specify any behind-the-scenes components for each facility thereby defining how those facilities will work. For instance, there is a configuration bootstrap task 302 for setting up the configuration facility. There could be sub-elements for plugging in a properties configuration source, a database configuration source, a ".ini" file, and the like. The configuration task and the sub-element tasks for each of the sources essentially define a resulting configuration facility produced by the configuration bootstrap task 302.

XML facility bootstrap 304 represents an entity that performs work. Dashed arrow 306 represents a dependency by the XML facility bootstrap 304 upon the XML facility deployment descriptor 300 for performing the XML facility bootstrap's work. A parse facility deployment descriptor step 308 parses XML facility deployment descriptor 300, which is fed into the parse facility deployment descriptor step 308 via the XML facility bootstrap 304 as indicated by arrows 310 and 312. The execute facility bootstrap tasks in descriptor step 314 operates on the XML facility deployment descriptor 300 broken down into its elements and iterates over those elements. Each of these elements will typically correspond to a bootstrap task class. Referring back to the configuration bootstrap task 302 example, configuration bootstrap task 302 preferably: (1) understands the XML facility deployment descriptor elements that were parsed; and (2) does the work of setting up the configuration sources and plugging them into the configuration facility. The XML bootstrap facility may define, as part of its tasks, a framework through which sub-elements are provided to the facility bootstrap task 324 through, for example, a set of simple set-value operations. Following the execute facility bootstrap tasks in descriptor step 314, the facility bootstrap process is complete, as depicted at 318 in FIG. 3, and the configuration facility is set up.

Application-specific facilities that could be unique to a particular project could also have their own corresponding bootstrap tasks. The facility bootstrap task 324 defines a common API for facility bootstrap tasks. Configuration bootstrap task 302, logging bootstrap task 320, and factory bootstrap task 322 are specific implementations of the facility bootstrap task API 324, as depicted by the hollow arrowhead leading from the configuration bootstrap task 302, the logging bootstrap task 320, and the factory bootstrap task 322 to the facility bootstrap task 324. Ellipses 326 in FIG. 3 represents that the bootstrap process can be extended by adding new bootstrap tasks. Dashed arrow 328 leading from the execute facility bootstrap tasks in descriptor step 314 to facility bootstrap task 324 represents a dependency of the execute facility bootstrap tasks in descriptor step 314 upon the specific implementations of the facility bootstrap task common API 324.

IV. Notation Used in Figures

Figure 4:
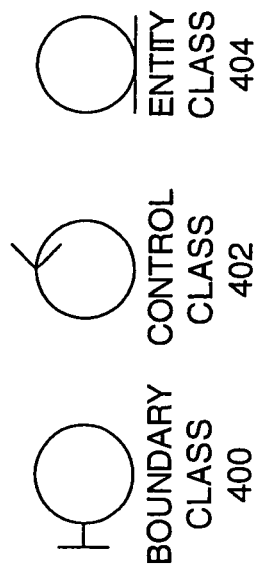
FIG. 4 depicts a legend for selected subsequent figures that are Unified Modeling Language ("UML") analysis models.

FIG. 4 is essentially a legend for FIGS. 4-5, 8, 11, 14, and 17, which depict Unified Modeling Language ("UML") analysis models. FIGS. 4-5, 8, 11, 14, and 17 show major entities within a model of various aspects of a toolkit and a net-centric application program in accordance with the present invention and how those major entities relate to one another. The different types of entities shown in these figures are depicted in FIG. 4. A boundary class 400 defines an API or an interface. A control class 402 defines a process or an operation for doing some work. An entity class 404 is a concrete thing. An entity class could implement an interface, or it could be a database or something else. In FIGS. 4-5, 8, 11, 14, and 17, arrows between these three major types of components represent either associations or transfers of control similar to a process flow.

V. Single Simple API

A common principal, which preferably appears in multiple contexts within a toolkit and/or an architecture in accordance with illustrative embodiments of the invention, is the use of a single simple API for application developers to use. Such an API preferably hides a server-provided interface that can have different implementations plugged in and/or composed behind the server-provided interface. The configuration facility is one example in which programmers can get properties of the system through a single get environment operation. The specific details about how such information is retrieved are preferably completely hidden. For example, the GrndsConfigurationSource interface, set forth below, defines a simple API, which concrete configuration sources may implement to provide their view of the system's configuration environment. The example Concrete class, GrndsSystemPropertySource, set forth below, implements getEnvironment( ), which returns a set of in-memory system variables. Normally, sources partition the configuration environment into domains and sub-domains, but in the example below, the GrndsSystemPropertySource assigns all system variables to every configuration domain and sub-domain combination. The other operations in the interface, in particular init( ), fini( ), clone( ) and refresh( ), are implemented to perform various lifecycle operations that may need to be performed by the source.

```
public interface GrndsConfigurationSource
extends Serializable, Cloneable
{
    public abstract GrndsConfigurationEnvironment getEnvironment(
            String domain_,
            String[ ] sub-domains_ )
    throws GrndsConfigurationException;
    public abstract void init( String[ ] args_ ) throws Exception;
    public abstract void fini( ) throws Exception;
    public abstract void refresh( );
    public abstract Object clone( );
}
public final class GrndsSystemPropertySource
extends GrndsObject implements GrndsConfigurationSource
{
    public GrndsSystemPropertySource( )
    {
        super( );
    }
    public GrndsSystemPropertySource( GrndsSystemPropertySource
    rhs_ )
    {
        super( );
    }
    public Object clone( )
    {
        return new GrndsSystemPropertySource( this );
    }
    public GrndsConfigurationEnvironment getEnvironment(
            String domain_,
            String[ ] sub-domains_ )
    {
        GrndsConfigurationEnvironment result =
                new GrndsConfigurationEnvironment( );
        result.putAll( System.getProperties( ) );
        return result;
    }
    public Enumeration getPropertyNames( String domain_,
            String[ ] sub-domains_ )
    {
        return System.getProperties( ).keys( );
    }
    public void init( String[ ] args_ )
    { }
    public void fini( )
    { }
    public void refresh( )
    { }
```

VI. Configuration Facility

A toolkit and program architecture in accordance with illustrative embodiments of the invention may include a configuration facility having a single API or method for getting properties that can be defined in any number of different sources. One or more of the sources could be: one or more properties files on one or more file systems; environment variables within one or more computers at run time; data within one or more databases; or any other number of suitable permutations and/or combinations of suitable sources. A configuration facility in accordance with illustrative embodiments of the invention enables an architect to assemble any number of these sources behind the configuration facility API so that application developers can go against a single API. The application developers, therefore, do not need to know where the sources are located. Through the bootstrapping process a project architect can assemble the configuration sources that the architect wants to provide to application developers. Any number of these configuration sources may be assembled into or, stated differently, included in the configuration facility.

The declarative style of the bootstrapping process advantageously facilitates modification of configuration data. For instance, a configuration facility could be used to define configuration data, such as a destination URL of a hyperlink. Rather than hard coding the URL, which would require re-compilation and rebuilding of all the code to change the destination URL, the configuration facility preferably associates the URL with a key. Then, the destination URL of the hyperlink can be changed by changing the value associated with the key, which does not require re-compilation and rebuilding of all the code. A configuration facility in accordance with illustrative embodiments of the invention enables an architect to plug different configuration information sources into the configuration facility, as desired, during the bootstrapping process. The configuration facility preferably depends on an abstract configuration source interface, but is provided concrete implementations of that interface, via the bootstrap process, to implement the get environment operation differently, such as to retrieve information from the system environment, from properties file from xml files, and/or the like. Example contents of an XML facility deployment descriptor document are provided in section VIII below.

Figure 5:
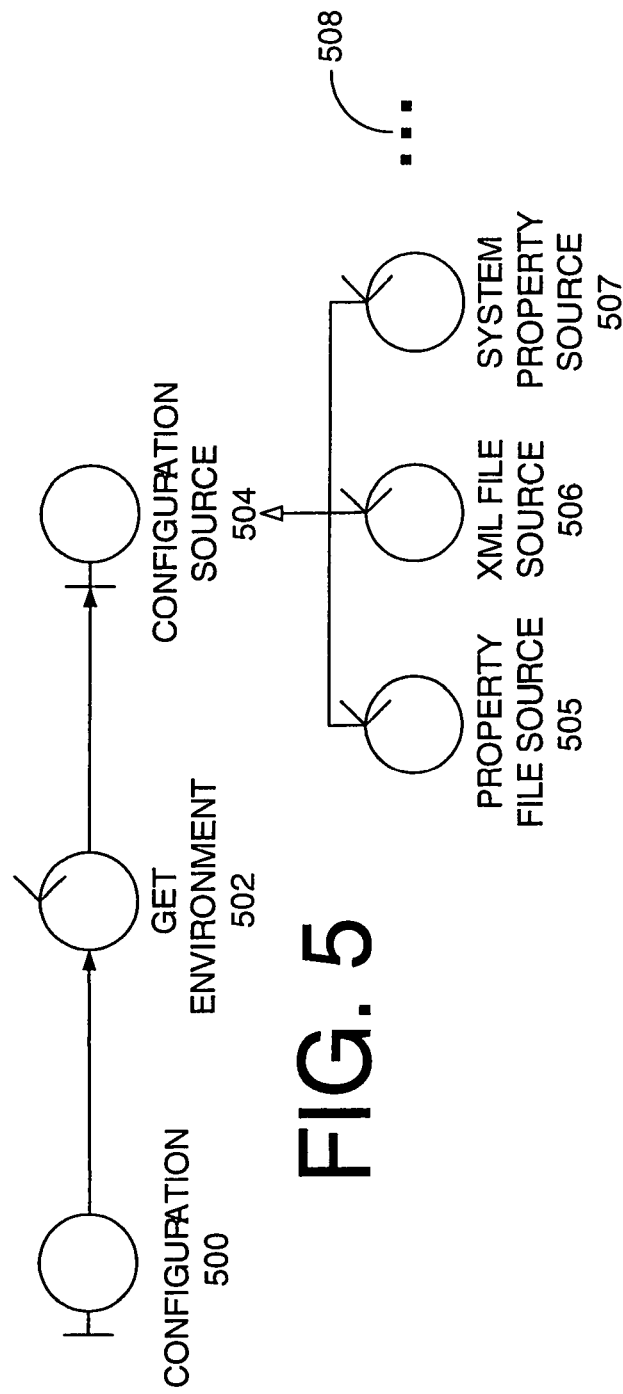
FIG. 5 depicts a UML analysis model for a configuration facility in accordance with illustrative embodiments of the invention.

FIG. 5 depicts a UML analysis model for a configuration framework in accordance with illustrative embodiments of the invention. The sources, or where the configuration comes from, are de-coupled from the act of getting to or accessing the configuration. The get configuration environment operation 502 is the main operation behind configuration API 500. The get environment operation 502 uses configuration source interface 504 to build a single environment based upon data from one or more configuration sources, such as property file source 505, XML file source 506, and system property source 507. Ellipses 508 in FIG. 5 represents additional configuration sources that can be plugged into an architecture via specific implementations of configuration source interface 504. The concrete implementations of configuration source interface 504, namely, property file source 505, XML file source 506, and system property source 507, are depicted in FIG. 5 with entity class symbols 404 to convey that these implementations of configuration source interface 504 perform respective operations of obtaining configuration information from various configuration sources. The configuration sources are plugged into the configuration API 500 via the bootstrap process, which is depicted in FIG. 5 and discussed above. Configuration sources may be specified via the configuration bootstrap task 502, or configuration sources may be specified in an XML file or the like to dictate how the configuration is assembled together.

The configuration facility builds the configuration environment by iterating over each configuration source, requesting its view of the environment. The configuration facility combines each source's environment view into a whole, preferably taking into consideration these precedence rules: configuration sources are ordered within the facility based on when they are added with earlier sources taking precedence over later sources. Configuration environments are organized into domains and sub-domains, which are logically defined, and sub-domains override information specified at the domain level.

Figure 6A:
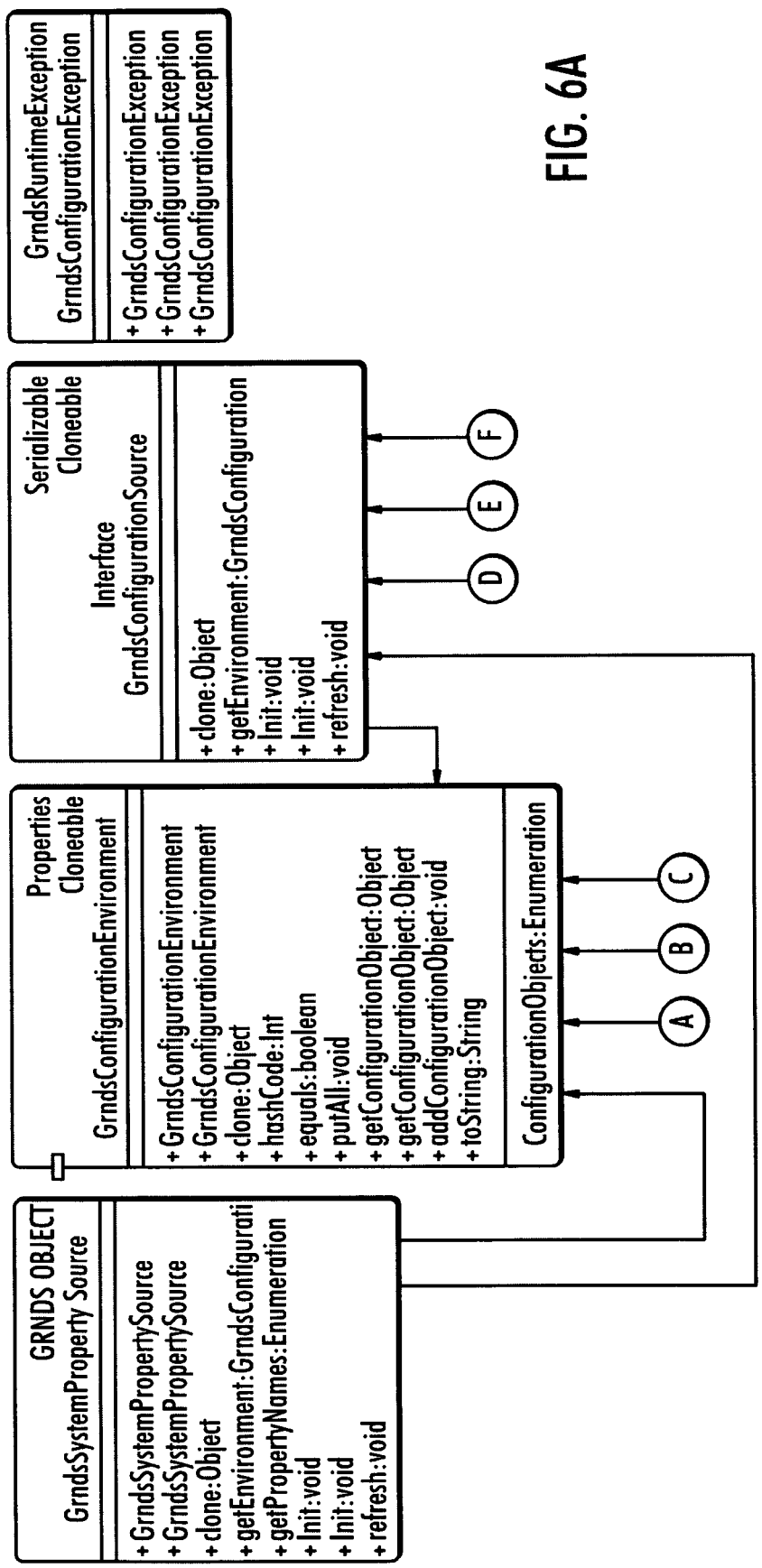
FIG. 6A depicts a first portion of a UML static class diagram for a detailed illustrative embodiment of a configuration facility in accordance with various inventive principles.
Figure 6B:
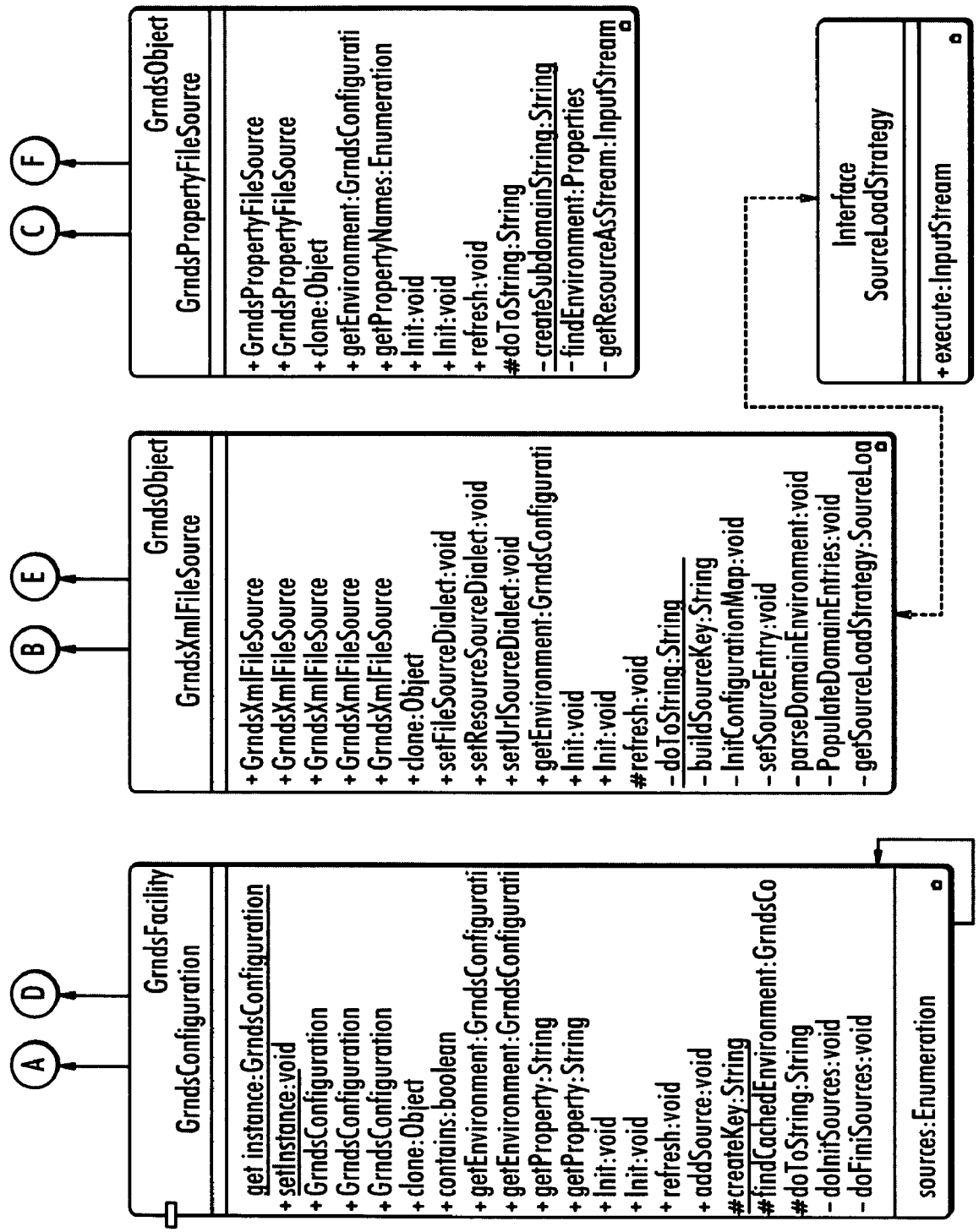
FIG. 6B is a second portion of the UML static class diagram depicted in FIG. 6A.

FIG. 6 depicts a UML static class diagram for a detailed illustrative embodiment of a configuration facility in accordance with various inventive principles. FIG. 6 shows major components of such a configuration facility, including GrndsPropertyFileSource 505', GrndsXmlFileSource 506', and GrndsSystemPropertySource 507' objects, which are concrete implementations of GrndsConfiguration common API definition 500'.

Figure 7:
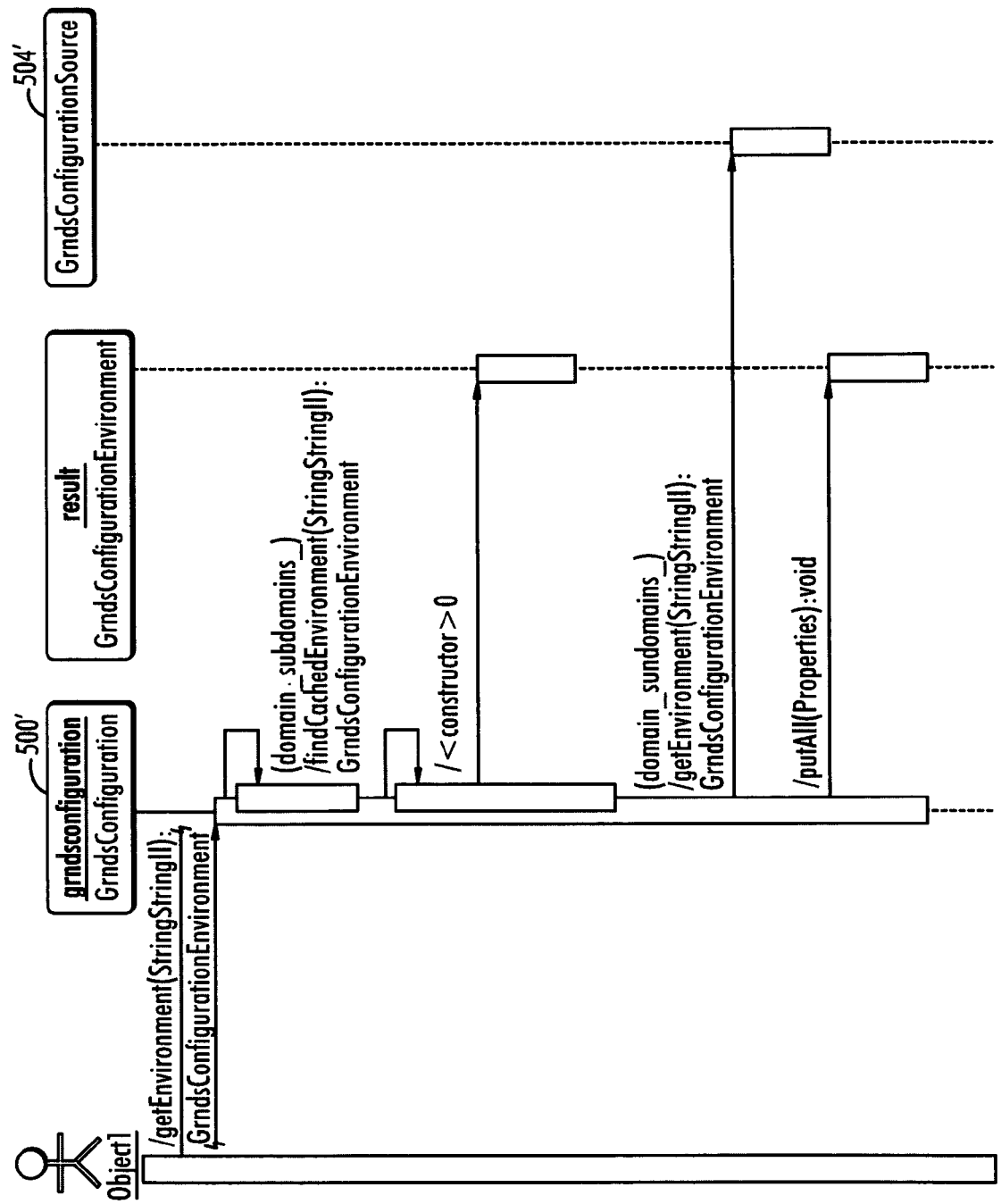
FIG. 7 depicts a UML dynamic sequence diagram for a detailed illustrative embodiment of the get environment operation of the configuration facility of FIG. 5 in accordance with various inventive principles.

FIG. 7 depicts a UML dynamic sequence diagram for a detailed illustrative embodiment of the get environment operation 502 in accordance with various inventive principles. FIG. 7 shows exemplary steps for delegating work from gmdsconfiguration 500' API to GrndsConfigurationSource 504'.

The bootstrapping process preferably defines a mechanism to actively set up application architecture facilities, whereas the configuration facility is typically one of the facilities set up by the bootstrap mechanism. The configuration facility preferably defines a mechanism to get information about the application and its environment at runtime. The bootstrap mechanism is preferably capable of setting up the configuration facility first, and then using data retrieved from the configuration facility to configure other facilities. While the bootstrap mechanism may use the configuration facility to help set up other facilities, the other facilities do net necessarily depend on the configuration facility. In fact, facilities are preferably defined to be independent of the configuration facility thereby enabling the bootstrap mechanism to use any means for getting environment information.

VII. Factory

A factory in accordance with illustrative embodiments of the invention may allow a developer to de-couple how a resource is produced from where the resource is used. This de-coupling provides significant benefits for maintaining an application program over a long period of time and facilitating making changes to the program. A factory in accordance with illustrative embodiments of the invention defines a simple API that application developers program in order to produce references to resources. How these references are produced can be plugged in according to any number of various strategies. This is unlike conventional factories, which typically are more rigid and suited to one particular type of a reference-producing scenario.

Figure 8:
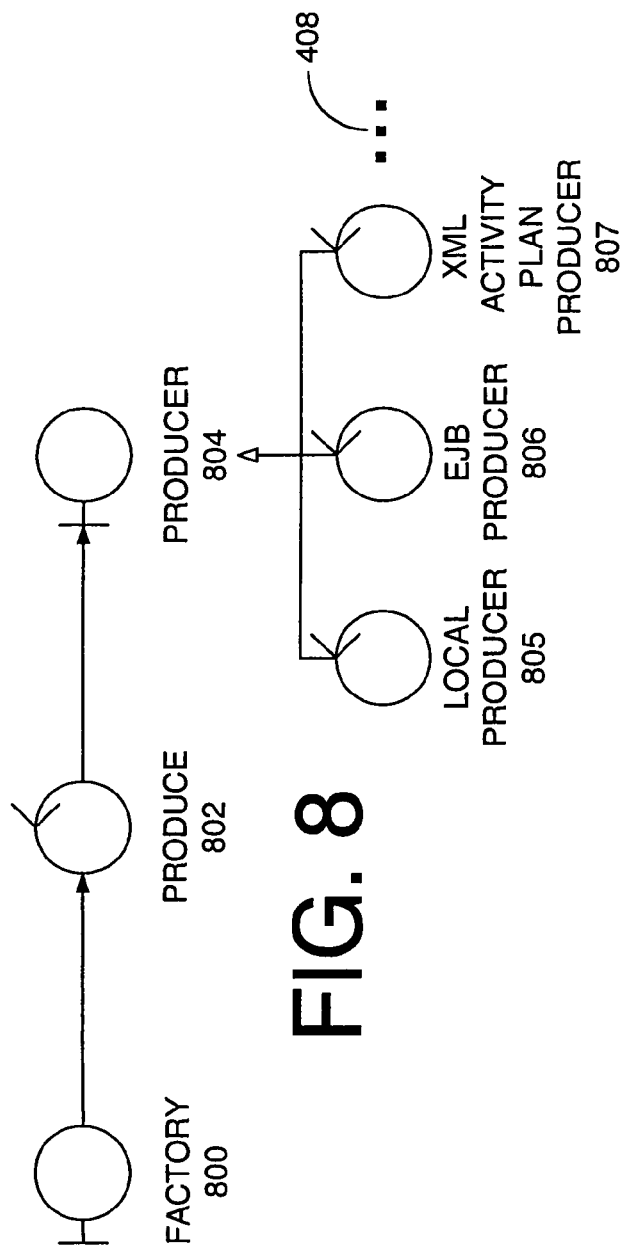
FIG. 8 depicts a UML analysis model, similar to FIG. 5, for a factory in accordance with illustrative embodiments of the invention.

FIG. 8 depicts a UML analysis model, similar to FIG. 5, for a factory in accordance with illustrative embodiments of the invention. The produce operation 802, which produces a reference to a resource, is the main operation behind the component factory API 800. Various producers, such as those represented by local producer 805, EJB producer 806, and XML activity plan producer 807 are concrete implementations of the producer interface 804. These producers produce references to resources. These producers are plugged into factory API 800 through the bootstrap mechanism. Alternatively, the factory could assemble various producers underneath it by using information located in a Java standard Properties class, such as one created using the configuration facility.

Figure 9:
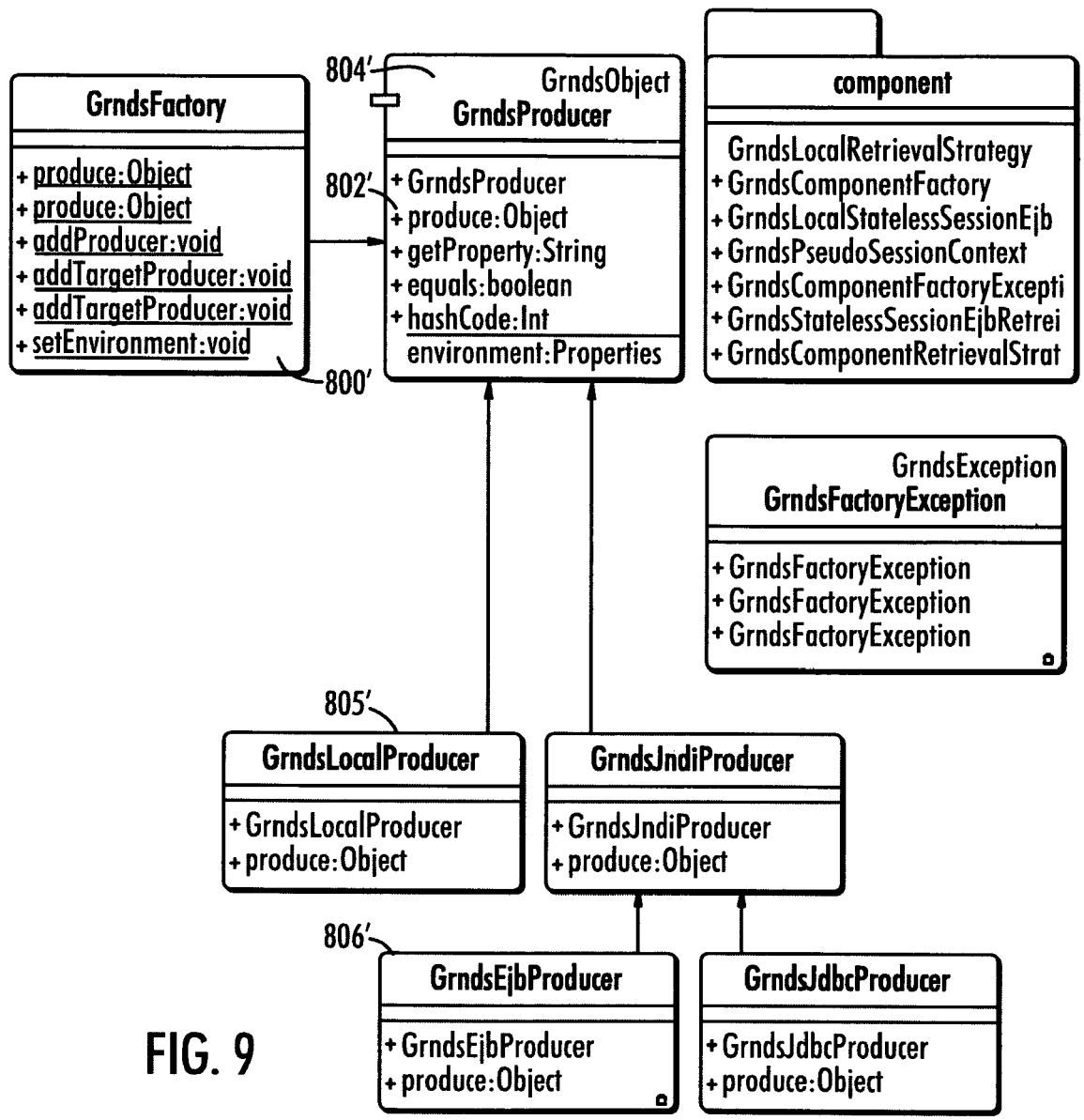
FIG. 9 is a UML static class diagram of a detailed illustrative embodiment of a factory in accordance with various inventive principles.

FIG. 9 is a UML static class diagram of a detailed illustrative embodiment of a factory in accordance with various inventive principles. FIG. 9 depicts the relationship among various components including GrndsFactory 800', GrndsProducer 804', produce 802', GrndsLocalProducer 805', and GrndsEjbProducer 806', which correspond to the following entities depicted in FIG. 8: component factory API 800, producer interface 804, the produce operation 802, local producer 805, and EJB producer 806.

Figure 10:
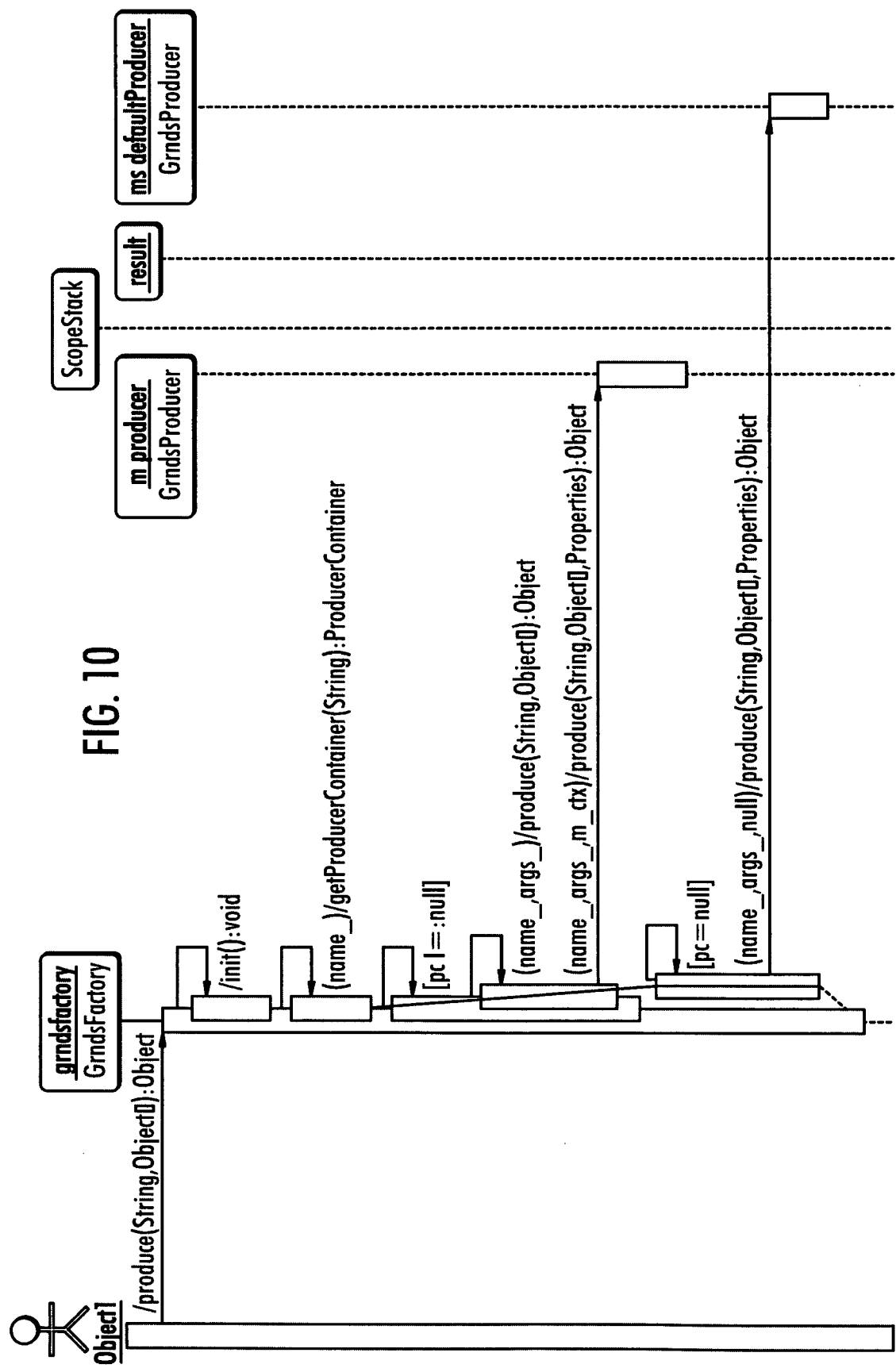
FIG. 10 is a UML dynamic sequence diagram showing exemplary steps performed by a detailed illustrative embodiment of a factory in accordance with various inventive principles.

FIG. 10 is a UML dynamic sequence diagram showing exemplary steps performed by a detailed illustrative embodiment of a factory in accordance with various inventive principles. FIG. 10 depicts exemplary steps for identifying a producer corresponding to a logical key or, if there is no corresponding producer, delegating to a default producer, which is preferably set up through a bootstrapping process in accordance with various inventive principles.

The factory facility provides a standard way of coupling subsystems and increasing the modularity of an application program thereby facilitating modification of the program. Advantageously, the factory facility may allow for moving access from local to distributed without breaking any higher level parts of an application. In other words, higher level portions of the application are not directly dependent upon particular resource references. Accordingly a generalized factory facility is provided that may allow for changing out different producers behind the scenes.

A factory in accordance with illustrative embodiments of the invention can be used to lower network connectivity-associated overhead by substituting a lighter weight co-located component for a heavier-weight distributed component, such as an Enterprise Java Bean ("EJB"). EJB's are typically maintained by an application server for performing tasks such as working with databases and/or legacy application software. A factory in accordance with illustrative embodiments of the invention advantageously may allow for the interchangeability of co-located components and distributed components without requiring modification of the code of either the co-located components or the distributed components. A factory in accordance with illustrative embodiments of the invention can also be used to facilitate production of various other types of resources including, but not limited to, accessing database connections and simplifying access to a central naming service.

VIII. Example Contents of an XML Facility Deployment Descriptor Document

Example contents of an XML facility deployment descriptor document in accordance with illustrative embodiments of the invention are set forth below.

```
<?xml version="1.0"?>
<!--DOCTYPE grnds-web-app SYSTEM "DTD/grnds-web-app.dtd"-->
<grnds-facility-deployment>
    <facilities>
        <configuration>
            <source
classname="org.grnds.facility.config.GrndsPropertyFilesource"/>
            <source classname=
            "org.grnds.facility.config.GrndsXmlFileSource">
                <domain name="webapp">
                    <config-sources>
                        <source>
                            <file>C:/bin/grnds-web-app-resrc.xconf</file>
                            <dialect-
class>org.grnds.structural.web.config.GrndsWebAppXmlDialect</
dialect-class>
                        </source>
                    </config-sources>
                    <sub-domain name="foo">
                        <config-sources>
                            <resource>grnds-web-app-resrc.xconf</resource>
                            <dialect-
class>org.grnds.structural.web.config.GrndsWebAppXmlDialect</dialect-
class>
                        </config-sources>
                    </sub-domain>
```

-continued

```
                </domain>
            </source>
            <source
classname="org.grnds.facility.config.GrndsSystemPropertySource"/>
        </configuration>
        <factory>
            <producer name="default"
classname="org.grnds.facility.factory.GrndsLocalProducer"/>
            <producer>
                <name>foo</name>
                <classname>org.grnds.facility.factory.GrndsEjbProducer</classname>
                <init-param>
                    <param-name>java.naming.factory.initial</param-name>
                    <param-value>weblogic.jndi.T3InitialContextFactory</
param-value>
                </init-param>
                <init-param>
                    <param-name>java.naming.provider.url</param-name>
                    <param-value>t3://localhost:7001</param-value>
                </init-param>
            </producer>
            <producer name="XmlPipeline"
classname=
"org.grndsx.structural.pipeline.GrndsXmlActivityPlanProducer"/>
                <target name="Authorization" producer="foo"/>
                <target name="alpha" producer="default">
                    <init-param>
                        <param-name>classname</param-name>
                        <param-
value>org.grnds.foundation.util.GrndsSerializableObject</param-value>
                    </init-param>
                </target>
                <target name="Plan" producer="XmlPipeline">
                    <init-param>
                        <param-name>plan.file</param-name>
                        <param-value>C:/grnds-test/test/grndsx/pipeline/plan-
descriptor.xml</param-value>
                    </init-param>
                </target>
        </factory>
    </facilities>
</grnds-facility-deployment>
```

As described above in connection with FIG. 5, XML Facility Bootstrap class 504 is preferably responsible for parsing an XML facility-deployment descriptor file 500 and for executing each facility bootstrap task. In the sample XML code set forth above, two facilities are bootstrapped: a configuration facility and a factory facility. The configuration facility is setup with three configuration sources of the type shown in FIG. 5: a property file source 505; an XML file source 506, which is further configured with a collection of XML files organized into domains and sub-domains; and a system property source 507.

In the example provided above, the factory facility is setup with a set of producers and targets. The producers are named, given an implementation class, and may be provided with additional configuration information. The factory targets are given a logical name, which can be used by developers to identify what should be produced, a named producer, and may be given additional properties to aid production. In this example, there is a named producer, XmlPipeline, which is assigned a single target, Plan. The Plan target is given a property, plan file, that the producer parses to produce an activity plan object, GrndsActivityPlan.

IX. Selectors

The selector framework may allow standard query language to be applied in contexts other than querying a database. The selector framework advantageously may allow defining context specific ways of evaluating identifiers within a selector expression. A Standard Query Language ("SQL") expression includes three major elements: identifiers, which are like variables; operators, such as a string comparison operator to check equality; and literals, such as numbers or character strings. The selector framework may allow application of these types of expressions in different contexts that typically will have different types of identifiers. This is unlike the use of SQL expressions in the database context wherein the identifiers are assumed to be database fields.

A selector facility in accordance with illustrative embodiments of the invention provides an engine for evaluating selector expressions and preferably offers a way to extend the selector framework to a number of different contexts. In addition to the Web application scenario, such as the airline ticket purchase example discussed below in section XII, the selector framework can be extended to the pipeline architecture, discussed below in section X. In the context of the pipeline architecture, selectors can be applied to various activities assembled into an activity plan to determine whether various activities should be applied to a message and/or to various elements within a message.

Figure 11:
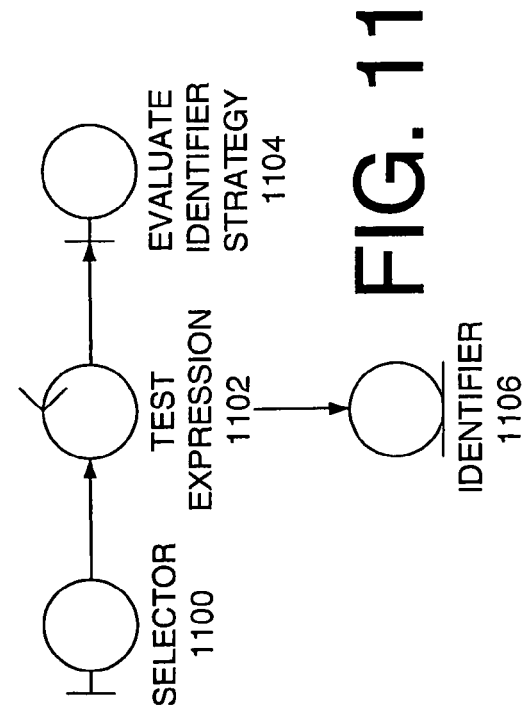
FIG. 11 depicts a UML analysis model for a selector framework in accordance with illustrative embodiments of the invention.

FIG. 11 depicts a UML analysis model for a selector framework in accordance with illustrative embodiments of the invention. Selector API 1100 can be used for testing whether an expression is true or not, as depicted by the test expression operation 1102. Test expression operation 1102 uses the evaluate identifier strategy API 1104 for applying selectors to different problems. For example, there could be a special identifier strategy for the pipeline for pulling identifiers from the pipeline context, from the message, or from other areas. This is different from the Web application context where identifier information could be pulled from an HTTP request or from some different parts of a Web session. Test expression 1102 applies the evaluate identifier strategy 1104 to the identifier entity 1106. Based upon the value of identifier 1106 and any literals in test expression 1102, a determination is made as to whether the test expression 1102 is true or false.

Figure 12:
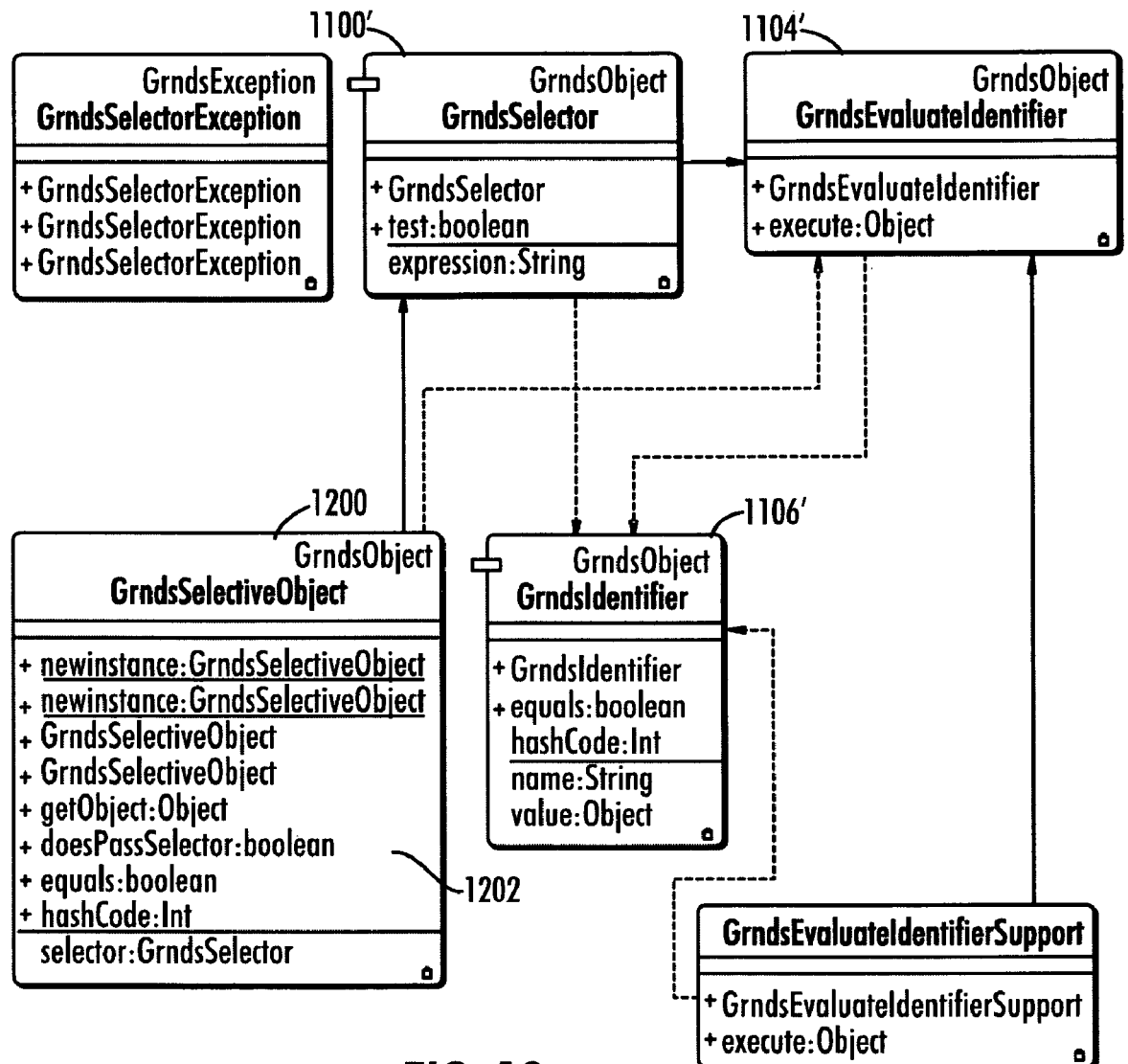
FIG. 12 is a UML static class diagram for a detailed illustrative embodiment of a selector framework in accordance with various inventive principles.
Figure 13:
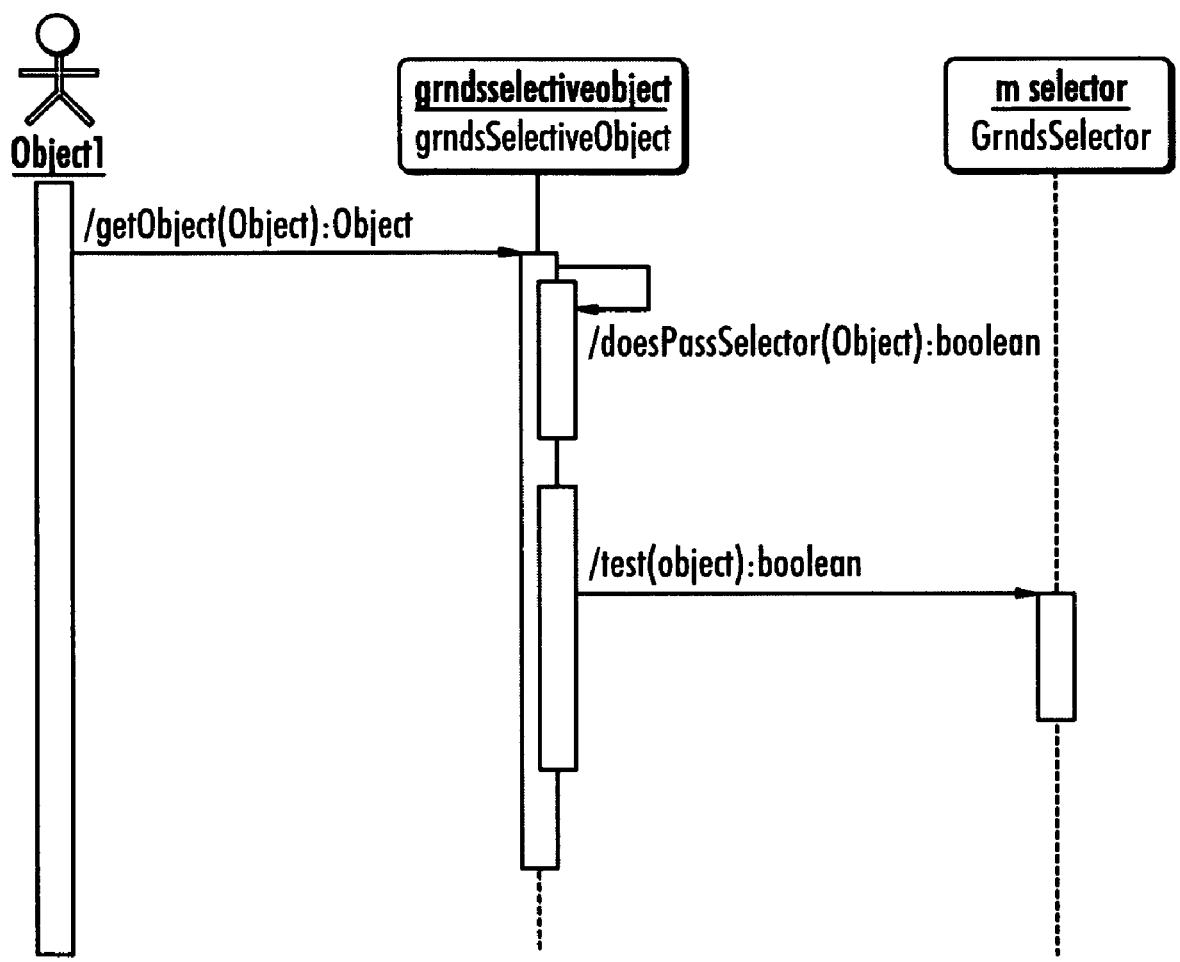
FIG. 13 is a UML dynamic sequence diagram showing exemplary steps for performing a getObject operation of GrndsSelectiveObject of FIG. 12.

FIG. 12 is a UML static class diagram for a detailed illustrative embodiment of a selector framework in accordance with various inventive principles. GrndsSelector 1100', GrndsEvaluateIdentifier 1104', and GrndsIdentifier 1106' correspond to the selector API 1100, the evaluate identifier strategy 1104, and the identifier entity 1106. GrndsSelectiveObject 1200 includes a getObject operation 1202, illustrative steps of which are depicted in FIG. 13.

Through various implementations of the evaluate identifier strategy API 1104 an application developer can specify which identifiers can be used within selector expressions thereby facilitating tailoring the selector framework to any number of different contexts.

A toolkit in accordance with illustrative embodiments of the invention preferably includes two separate and unique concrete implementations of the evaluate identifier strategy 1104, with one implementation corresponding to the pipeline and another implementation corresponding to the Web application. These unique strategies are passed into selector 1100 during the building of selector expression 1102. Selector expressions are built when the web application XML map and pipeline activity plan are constructed; such as, during interpretation of XML configuration data for each respective framework.

X. Pipeline Architecture

Under certain circumstances, a message oriented middleware approach facilitates integrating disparate computing systems by allowing one system to publish data to a work queue and by allowing a second system to subscribe to messages from the queue. In this manner, the two computer systems are advantageously able to remain relatively de-coupled.

A pipeline architecture in accordance with illustrative embodiments of the invention enables an architect to define a model view controller-like framework for a processing pipeline or message oriented middleware-type application. An application architect and/or developer can specify how each processing component does work through a series of fine-grained activities. In general, a processing component will receive a message as an input and produce a message as an output.

The specified activities can be assembled together into an activity plan. There could be several different aspects of an activity plan for covering the basic steps that are commonly performed by processing components. For instance, processing of messages, processing of elements within a message, how output is produced, how errors are handled, how redelivered messages are handled, and the like.

The pipeline architecture provides a structured manner for specifying these fine-grained activities. The pipeline architecture provides a significant benefit by allowing developers to focus on writing these fine-grained activities. Developers can then re-use these fine-grained activities in many different types of plans. This in turn significantly simplifies development, testing, integration, maintenance, and modification of an application built in accordance with various inventive pipeline architecture principles.

Figure 14:
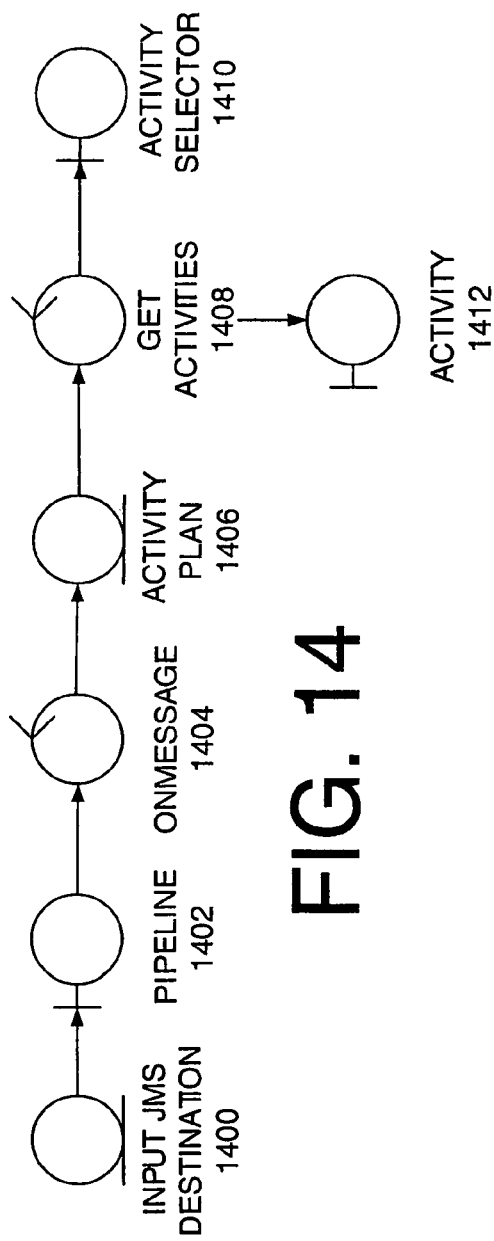
FIG. 14 depicts a UML analysis model of a processing pipeline in accordance with illustrative embodiments of the invention.

FIG. 14 depicts a UML analysis model of a processing pipeline in accordance with illustrative embodiments of the invention. JMS is a standard Java API for message oriented middleware. Destinations are a major component of the JMS. Destinations are code that plugs into the JMS middleware for receiving messages. The pipeline 1402 subscribes to and receives messages and/or events from input JMS destination 1400. When the pipeline 1402 receives a message, pipeline 1402 invokes the onMessage process 1404, which uses an activity plan 1406.

The activity plan 1406 is an entity that describes the various activities that are used for processing the incoming message. In this manner, the activity plan defines the plan for performing that processing. Activity plans are described in more detail below.

The get activities operation 1408 uses activity selector 1410, which is similar to the selector framework used for Web application flow, to execute one or more activities 1412. These activities will typically be application-specific concrete implementations of Activity interface 1412 for performing tasks within an application. Typically, there will be many different activities within an activity plan 1406. Activities can be filtered or used based upon a selector expression wherein the selector expression is based upon information in the received message, some state of the application, or the like. Accordingly, not all activities in an activity plan will necessarily be executed for a particular message. Instead, activities may be selectively executed for a particular message.

Figure 15A:
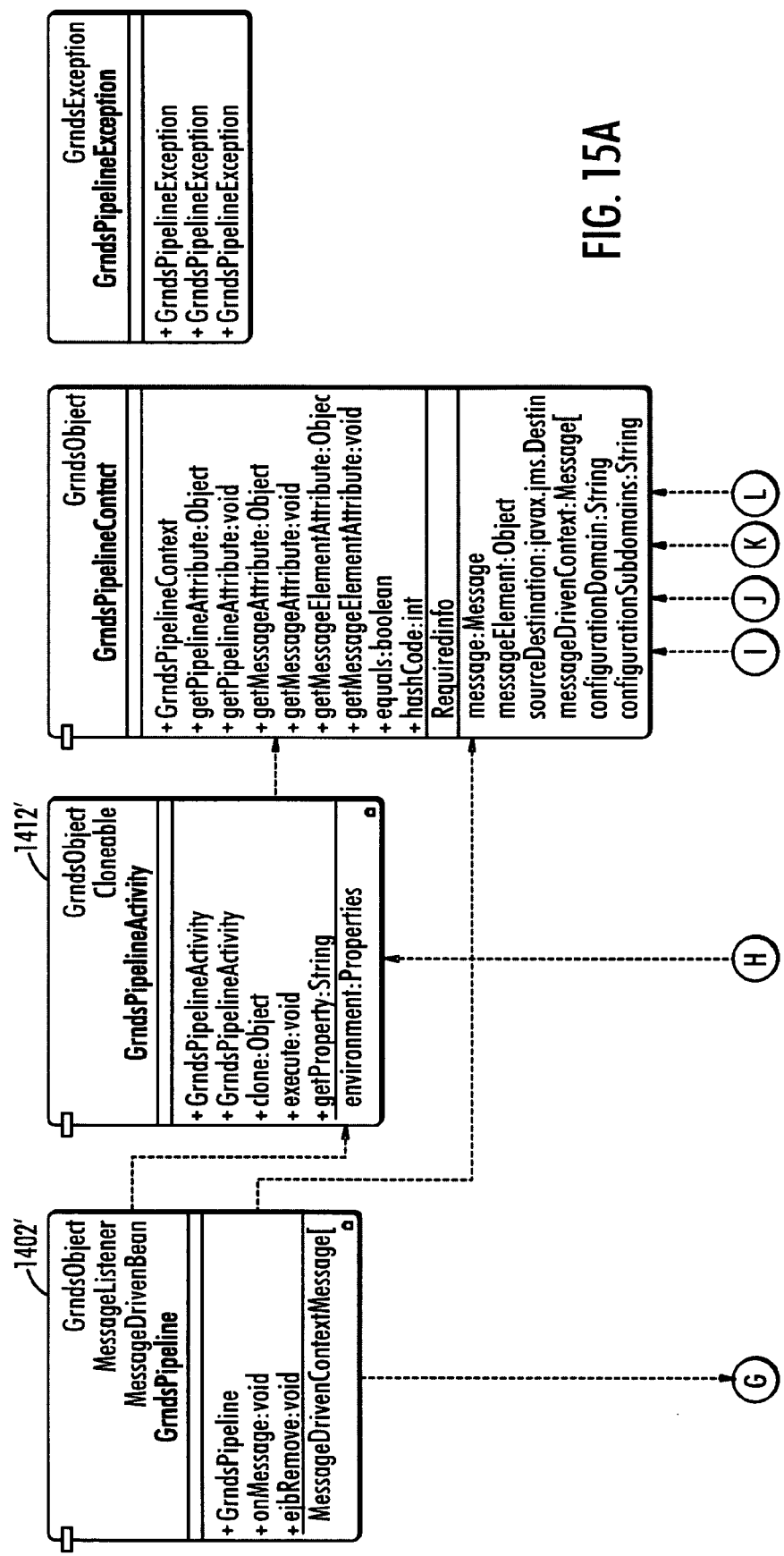
FIG. 15A is a first portion of a UML static class diagram for a detailed illustrative embodiment of a pipeline architecture in accordance with various inventive principles.
Figure 15B:
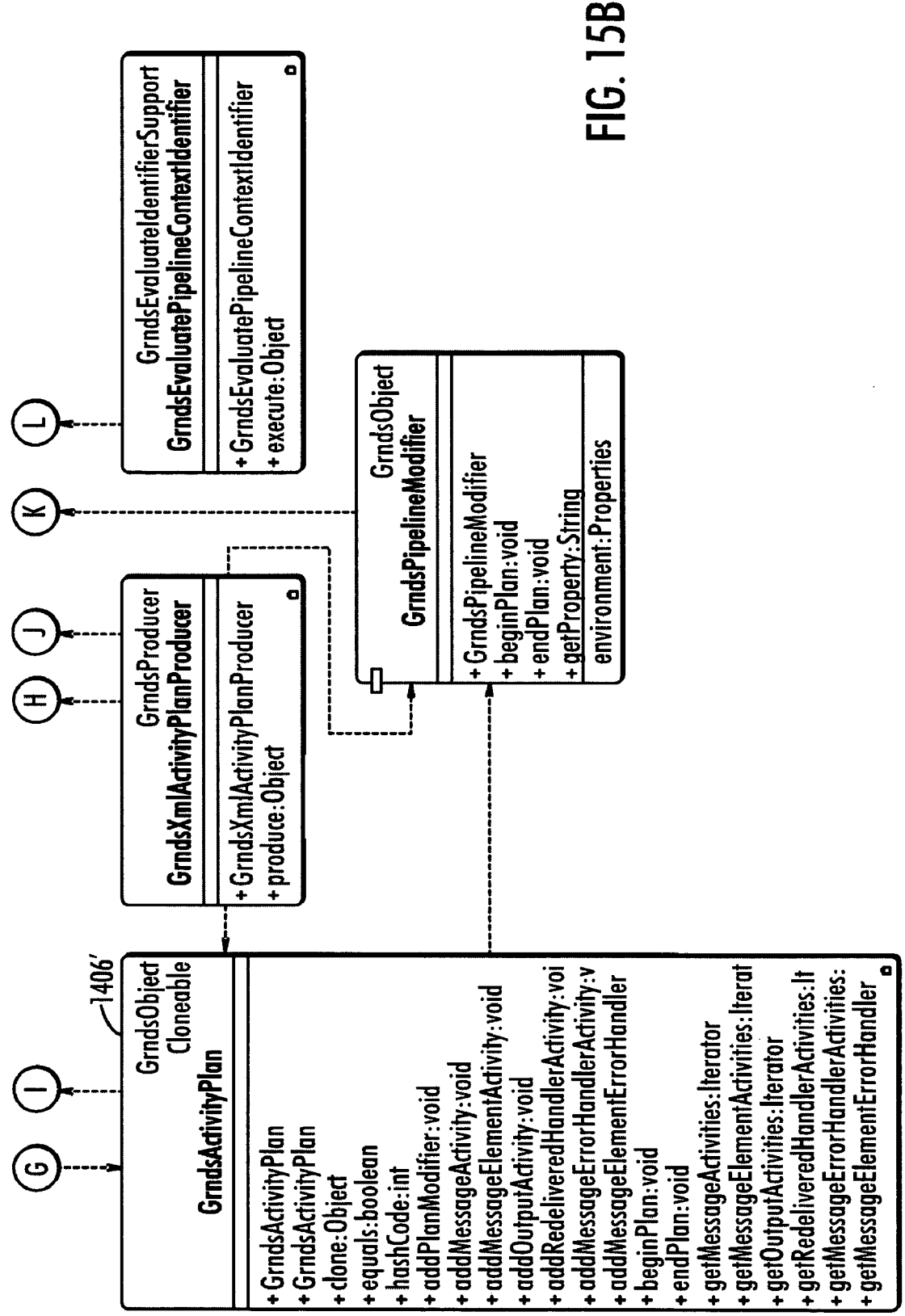
FIG. 15B is a second portion of the UML static class diagram depicted in FIG. 15A.

FIG. 15 is a UML static class diagram for a detailed illustrative embodiment of a pipeline architecture in accordance with various inventive principles. GrndsPipeline 1402', GrndsActivityPlan 1406', and GrndsPipelineActivity 1412' correspond to pipeline 1402, activity plan 1406, and activity interface 1412.

Figure 16A:
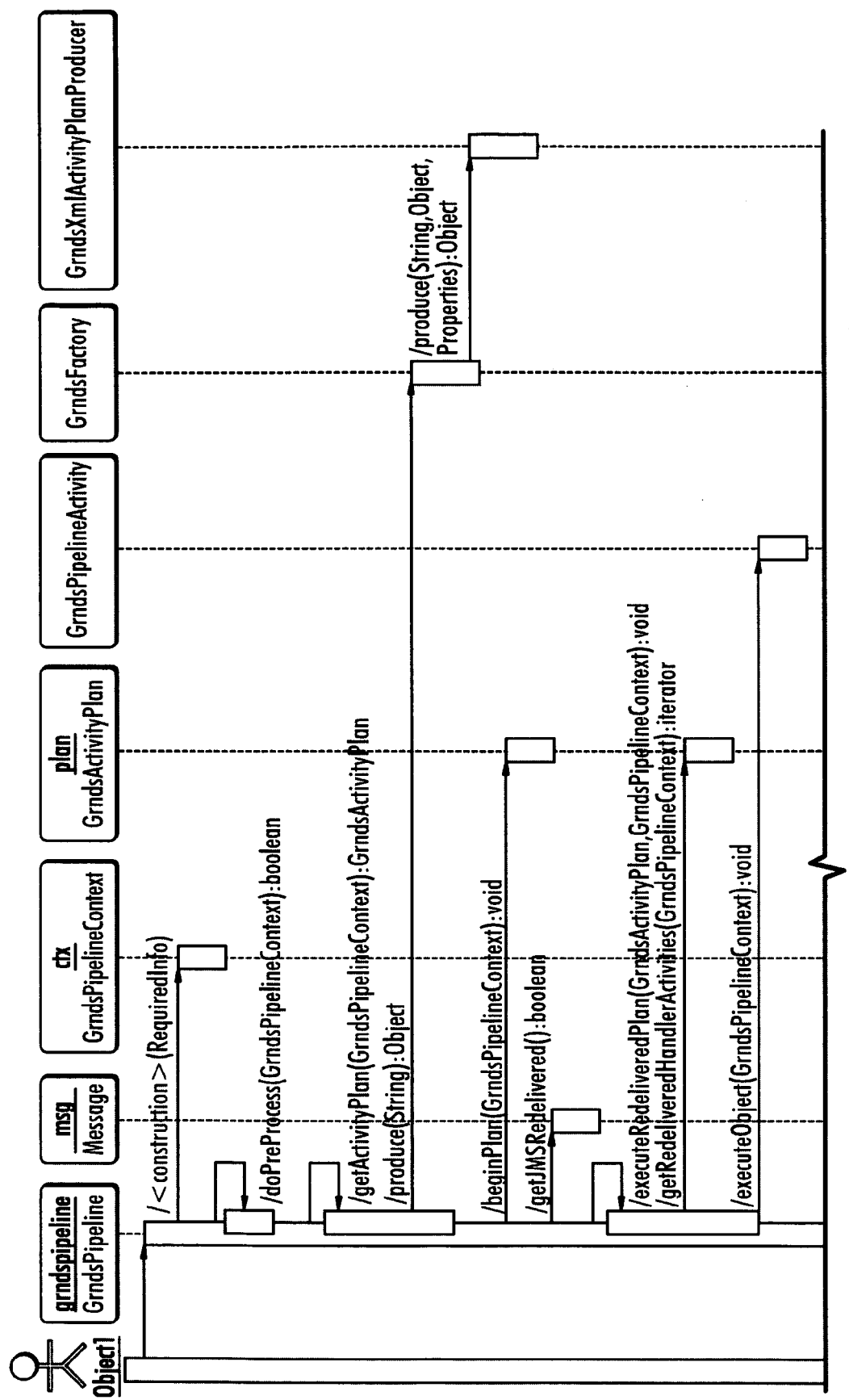
FIG. 16A is a first portion of a UML dynamic sequence diagram showing exemplary steps for implementing a pipeline architecture in accordance with a detailed illustrative embodiment of the invention.
Figure 16B:
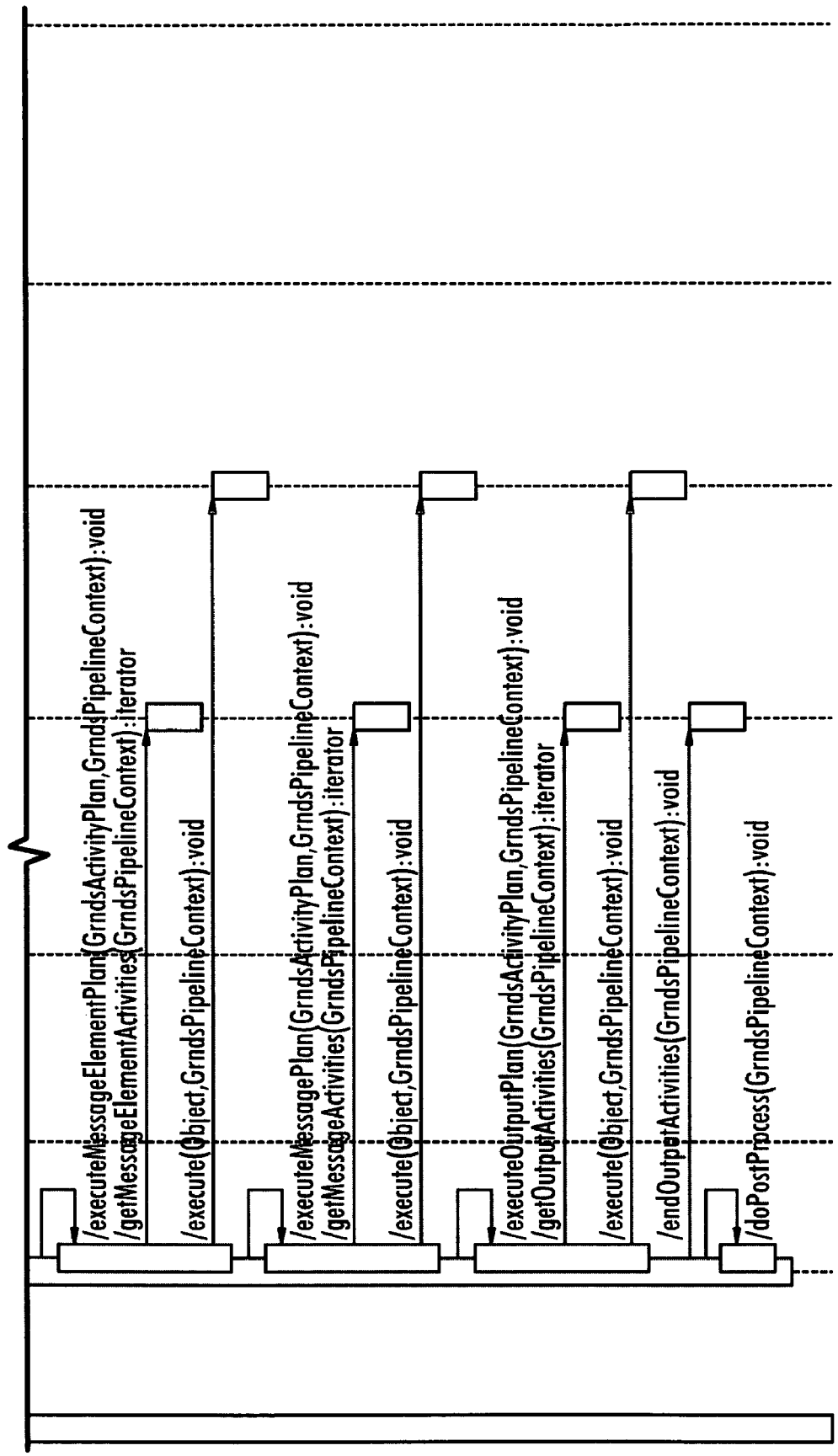
FIG. 16B is a second portion of the UML dynamic sequence diagram depicted in FIG. 16A.

FIG. 16 is a UML dynamic sequence diagram showing exemplary steps for implementing a pipeline architecture in accordance with a detailed illustrative embodiment of the invention. FIG. 16 depicts steps for abstracting various details of message oriented middleware so that developers are able to focus on developing activities for processing messages to perform specific tasks, thereby facilitating re-use of these activities in various types of activity plans.

XI. Activity Plan

An activity plan, which is described in more detail below, essentially defines the steps to perform some process. The processing pipeline 1402 is an engine that receives events or messages. The pipeline 1402 does work through activities. An activity plan, such as activity plan 1406 tells the pipeline 1402 which activities should be performed and under what conditions those activities should be performed. In this manner, the activity plan 1406 ties specific tasks or activities together into a cohesive process.

An activity plan in accordance with illustrative embodiments of the invention, such as activity plan 1406, may include several different sections. One section could be a redelivered section for handling a situation in which a message is being redelivered, which may occur when a server shuts down and is restarted. Under these circumstances, messages may be sent more than once, which is not a normal operating condition.

For more common situations, an activity plan may include a message section, which performs activities on a received message at the message level or, in other words, performs activities on a received message as a whole. Messages, however, could contain many elements. Accordingly, an activity plan may include a message element section that executes a series of activities on individual elements within a received message. For example, if a message has five elements within its body, then the message element section would be applied to each of these five elements. Stated another way the message elements section would be applied five times.

An activity plan may also include an output section for doing work to produce output or results of the process at the message level. Accordingly, the output section would typically be executed one time per message. An activity plan may also include a set of error handling sections that may be applied at the message level and/or the message element level for handling situations in which errors are thrown while processing a message.

XII. Web Application Framework Control

Within a Web application, there are often conversations, or portions of the application, that should follow a very specific control flow, such as going from page A to page B to page C in only that specific order. For instance, when a person uses a Web application to purchase an airline ticket and reserve a seat on a particular airline flight, the person should not be able to reserve a seat without already having purchased a ticket. A person, however, could bookmark a page for reserving a seat and could potentially reserve a seat on another flight by returning to the book-marked page without having first purchased a ticket for this other flight. This scenario is possible under certain circumstances due to the relative lack of control of the manner in which users enter Web applications via the Internet. Web application developers frequently confront this situation, namely, controlling the continuity of conversations within Web applications. The term conversation refers to a cohesive set of pages that act together to perform some unit of work, such as purchasing an airline ticket or editing user profile information.

An architecture in accordance with illustrative embodiments of the invention provides a way of controlling conversation flow through the use of one or more selectors. Within the Web application framework context, a selector is a logical expression that makes certain portions of a conversation available when certain specified conditions have been met. For example, in the context of the airline ticket purchase and seat reservation example, an application could set a flag, or a variable, to indicate that the user has purchased a ticket before sending the user to the seat selection page. A corresponding selector could be associated with producing the seat selection page. The selector could then be evaluated and used for making the seat reservation page available if and only if the user has actually purchased a ticket for a particular flight. Accordingly, if a user book-marked the seat selection page and entered the application directly into the seat selection page without first purchasing a ticket for the flight, the web application would not allow the user to select a seat because the selector would evaluate to false thereby causing an error page to be displayed to the user and/or some other appropriate action to be taken.

The selectors-based approach provides a significant advantage relative to conventional techniques for controlling web application flow because the selectors-based approach is decentralized and relatively lightweight. Selectors advantageously provide a simpler way to control the continuity of conversations relative to conventional techniques, which often require modeling an application as a finite state machine. Modeling Web applications as finite state machines is a relatively complex task.

Figure 17:
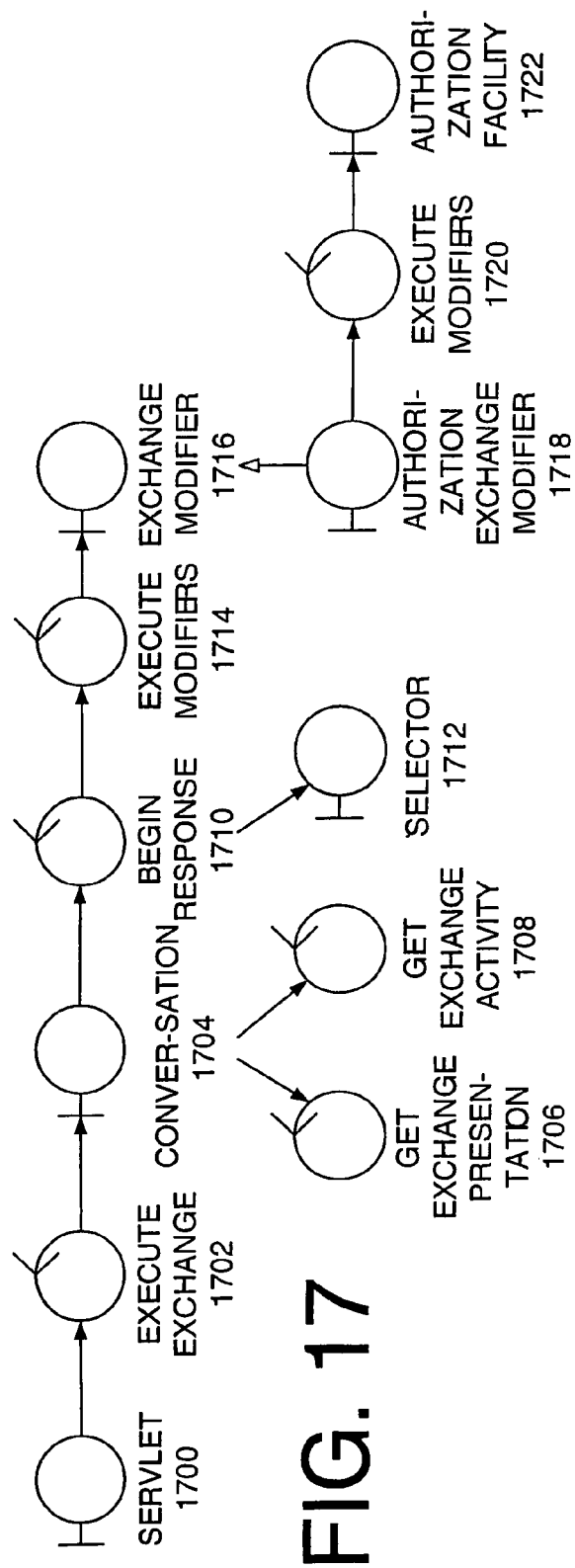
FIG. 17 depicts a UML analysis model for controlling Web application flow in accordance with illustrative embodiments of the invention.

FIG. 17 depicts a UML analysis model for a Web application in accordance with illustrative embodiments of the invention. Servlet 1700 is a standard API within the Java language. Servlet 1700 is a plug-in point for the server. When a Web request comes from a browser to a Web server, the elements that do work to process the request are implemented behind the servlet API 1700. Accordingly, the remainder of FIG. 17 implements that API and plugs into that engine.

FIG. 17 shows how processing of a Web request may be structured in accordance with illustrative embodiments of the invention. The execute exchange operation 1702 is the main operation behind the Servlet 1700 API. The execute exchange operation 1702 implements specific details of its algorithm using the conversation interface 1704. The conversation interface 1704 provides access to get exchange presentation 1706 and get exchange activity 1708. These elements define the separation of concerns within the model view controller framework. The implementation of Servlet 1700 depicted in FIG. 17 translates user events, such as a user clicking on a link or a button, into application commands. The processing of those application commands includes two main units of work. The first main unit of work is performing some business activity in conjunction with the model layer, which defines the business logic. The activity defines the application logic, while the model layer defines the more detailed business logic, which may span applications. The second main unit of work is that the results of the activity are displayed through a presentation, which defines the view layer. The conversation defines associations between the activity and presentation elements with their corresponding user events.

When execute exchange 1702 begins running, it tells the conversation 1704 to do whatever work the conversation needs to do before the exchange's activity and presentation are processed. The begin response operation 1710 looks to see whether there are any selectors 1712 registered for the received event/command. If a selector is identified for the received event/command, it is evaluated. If the selector evaluates to true, the event/command is processed further, otherwise an illegal state exception is thrown, which may be routed by the J2EE platform to an error page presented to the user.

Once one or more selectors 1712 have been evaluated, an execute modifiers sub-process 1714 of the begin response operation 1710 transfers control to the execute modifiers operation 1714 and the exchange modifier 1716 API, which defines one or more extensions to the conversation, such as the authorization exchange modifier 1718. The execute modifiers operation iterates over each configured exchange modifier and executes them sequentially. The authorization exchange modifier 1718 checks whether the user has an appropriate permission to work with a particular part of an application or to perform a particular command, which is done through authorization facility 1722, which is described in more detail below.

There is preferably an XML document that describes the Web application structure. Such an XML document preferably ties: conversations to Servlets; commands to conversations; and activities and presentations to those commands. Such an XML document also preferably ties one or more selectors to those commands, and, with respect to the authorization facility 1722, the XML document may allow for specification of a minimum set of permissions that a user needs to have in order to execute a conversation and/or any specific command within a conversation.

If all of these authorization permission checks pass, then the conversation will return the configured exchange activity, which the servlet will run, and the servlet will work with various components within the business model to do work such as looking up all the seats that are available in the airline ticket purchase and seat reservation example. The servlet will then execute the presentation or, stated otherwise, output results to the user.

Figure 18A:
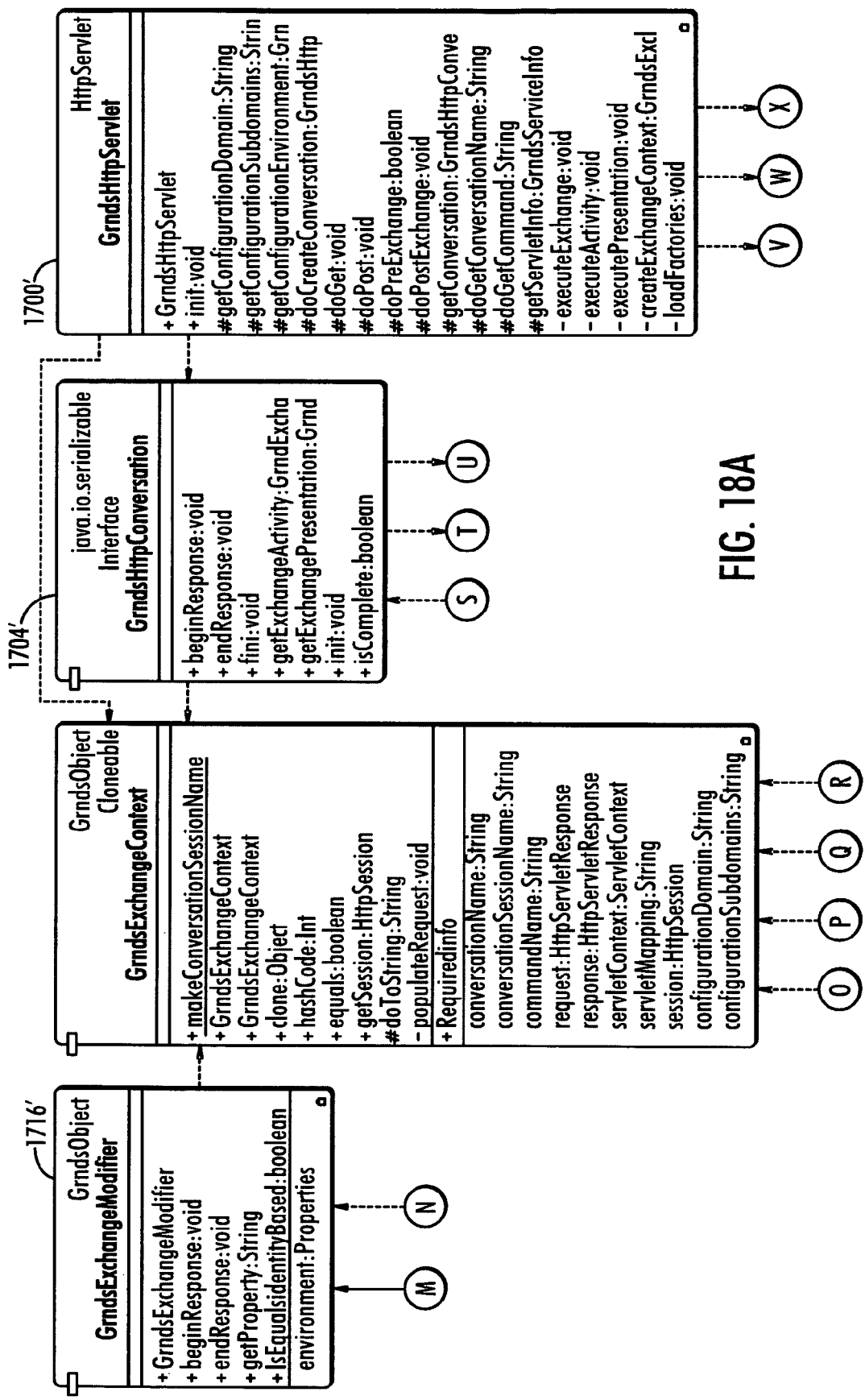
FIG. 18A is a first portion of a UML static class diagram for a detailed illustrative embodiment of a Web application framework in accordance with various inventive principles.
Figure 18B:
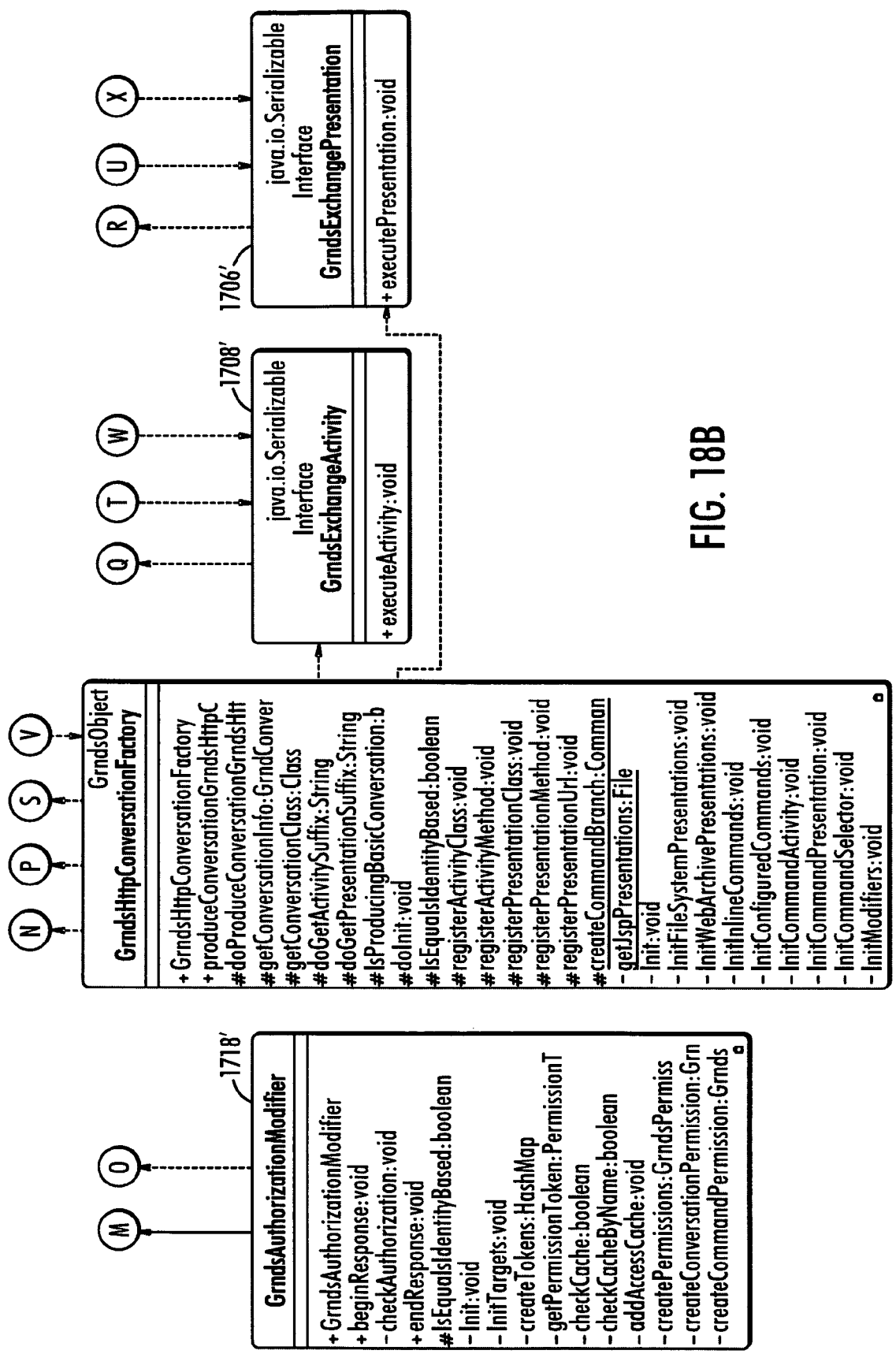
FIG. 18B is a second portion of the UML static class diagram depicted in FIG. 18A.

FIG. 18 is a UML static class diagram for a detailed illustrative embodiment of a Web application framework in accordance with various inventive principles. Entities depicted in FIG. 18 with prime reference numbers correspond to entities having corresponding non-prime reference numbers.

Figure 19A:
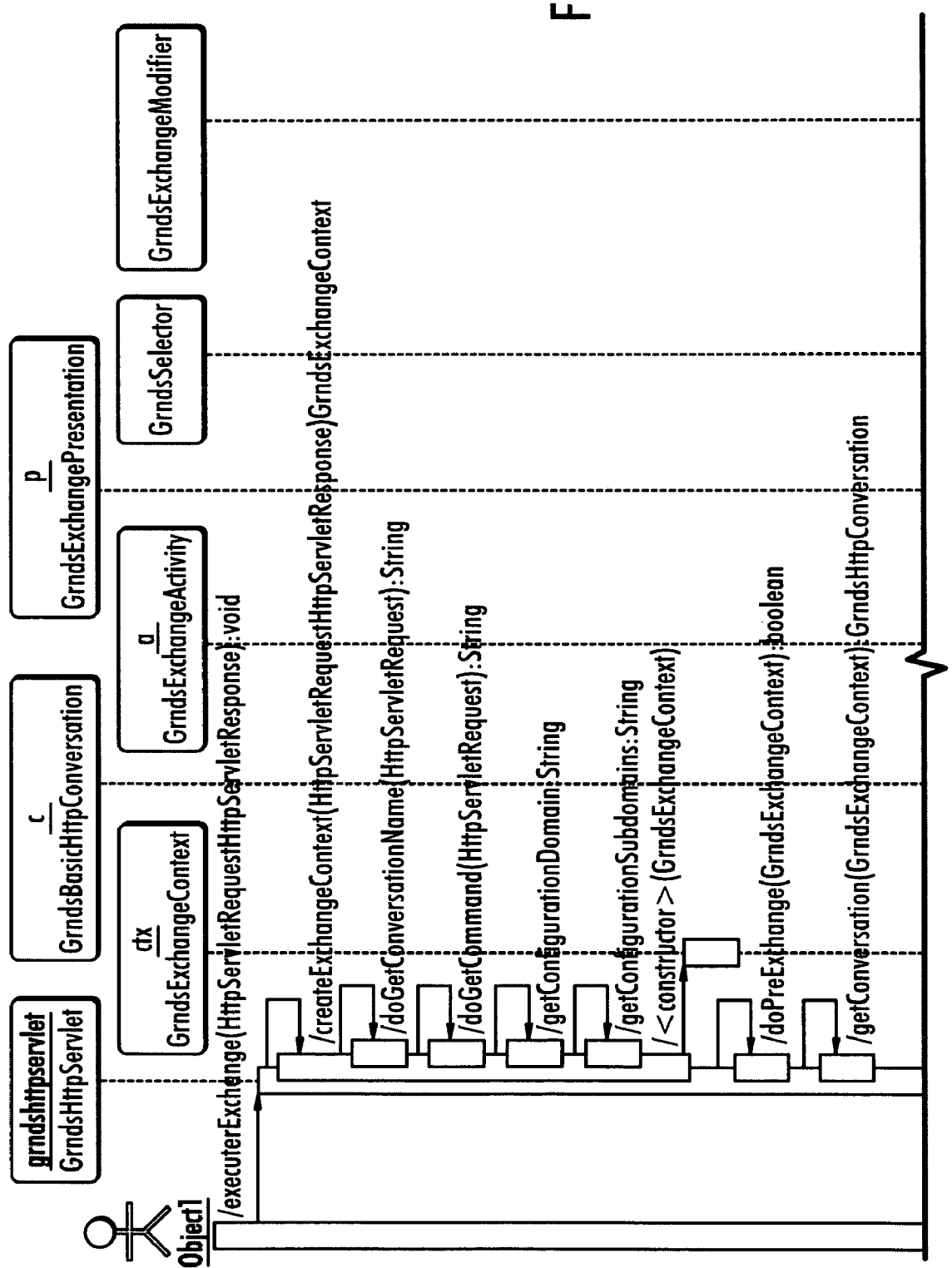
FIG. 19A is a first portion of a UML dynamic sequence diagram showing exemplary steps performed by a servlet for handling a request from a Web browser in accordance with a detailed illustrative embodiment of the invention.
Figure 19B:
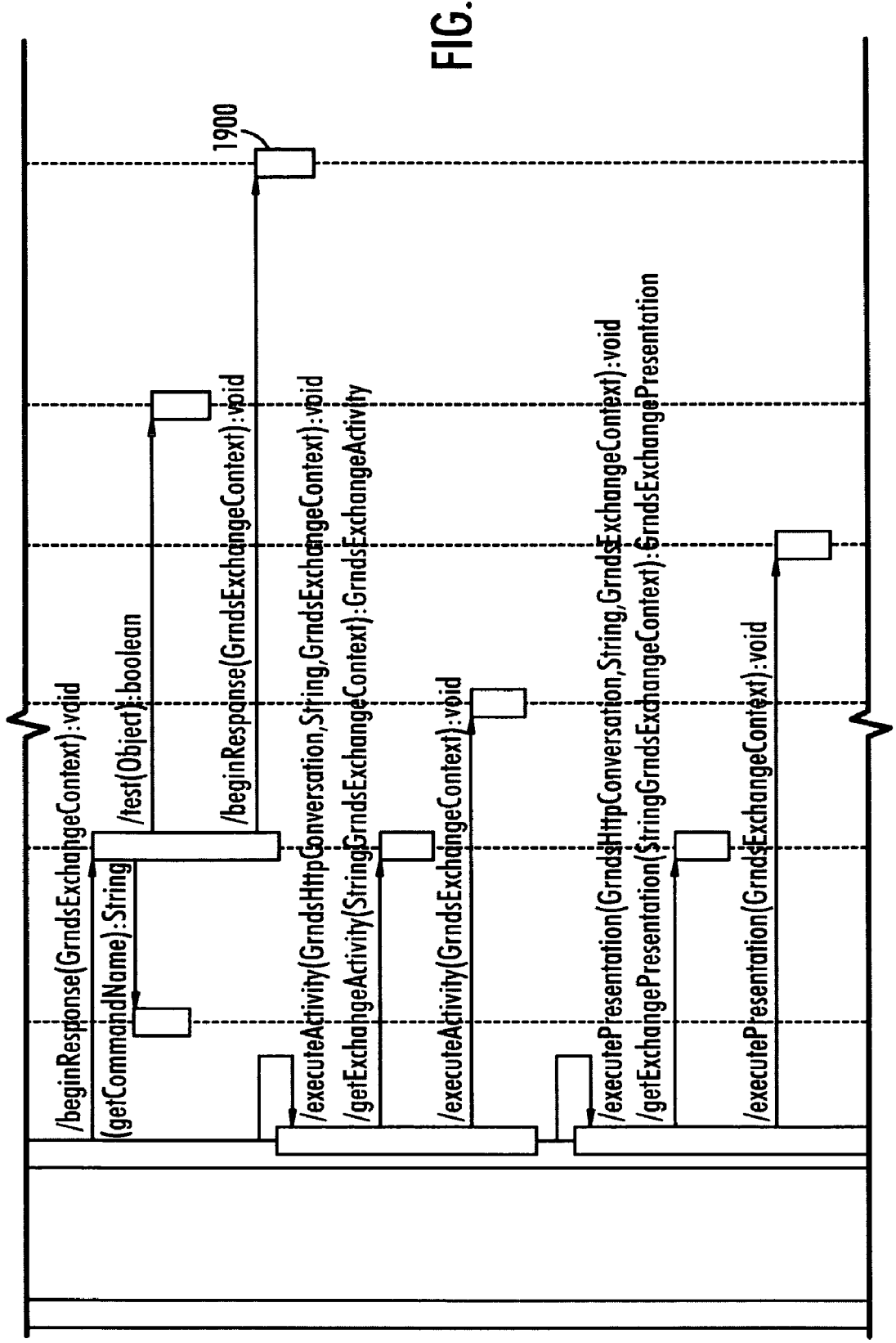
FIG. 19B is a second portion of the UML dynamic sequence diagram depicted in FIG. 19A.

FIG. 19 is a UML dynamic sequence diagram showing exemplary steps performed by a servlet for handling a request from a Web browser in accordance with a detailed illustrative embodiment of the invention.

Contents of an example XML document for describing the structure of a web application in accordance with illustrative embodiments of the invention are set forth below.

```
<?xml version="1.0"?>
<!--DOCTYPE grnds-web-app SYSTEM "DTD/grnds-web-app.dtd"-->
<grnds-web-app>
    <servlet mapping="gallery">
        <conversations>
            <conversation>
                <default-conversation/>
                <conversation-class>
                    homesite.HomesiteConversation
                </conversation-class>
                <commands>
                    <command>
                        <command-name>default</command-name>
                        <!--
                        -- command is available iff configuration property,
                        -- isGalleryAvailable, equals 'true'
                        -->
                        <selector>
                            <![CDATA[config.isGalleryAvailable = 'true']]>
                        </selector>
                        <activity type="method">default_xa</activity>
                        <presentation type="url">
                            /grnds-docs/gallery/default/default.jsp
                        </presentation>
                        <presentation type="url" branch="error">
                            /grnds-docs/gallery/default/default.error.jsp
                        </presentation>
                    </command>
                </commands>
                <modifiers>
                    <modifier>
                        <modifier-class>
                            org.grnds.structural.web.GrndsAuthorizationModifier
                        </modifier-class>
                        <!-- Apply permission at conversation level -->
                        <init-param>
                            <param-name>conversation.permission.class</param-name>
                            <param-value>homesite.GalleryPermission</param-value>
                        </init-param>
                        <init-param>
                            <param-name>conversation.permission.resource</param-name>
                            <param-value>*</param-value>
                        </init-param>
                        <init-param>
                            <param-name>default.permission.actions</param-name>
                            <param-value>read</param-value>
                        </init-param>
                        <!-- Apply permission to default command -->
                        <init-param>
                            <param-name>default.permission.class</param-name>
                            <param-value>homesite.GalleryPermission</param-value>
                        </init-param>
                        <init-param>
                            <param-name>default.permission.resource</param-name>
                            <param-value>*</param-value>
                        </init-param>
                        <init-param>
                            <param-name>default.permission.actions</param-name>
                            <param-value>read</param-value>
                        </init-param>
                    </modifier>
                </modifiers>
            </conversation>
        </conversations>
    </servlet>
</grnds-web-app>
```

In the example set forth above, there is a single servlet, called "gallery", comprising a single conversation. The conversation contains one command and is protected by an authorization modifier. The command, default, has a selector that prevents it from being available if the configuration property, isGalleryAvailable, is not set to "true". The default command is associated with a single activity, implemented by the conversation method "default_xa( )". The default command is associated to two presentations: a standard path implemented via the /grnds-docs/gallery/default/default.jsp file; and an alternative implemented via the /grnds-docs/gallery/default/default.error.jsp file. The alternative presentation branch is used if the activity set the presentation branch by calling the conversation's setPresentationBranch("error"). The authorization modifier sets two permissions, one for the conversation and one for the default command.

XIII. Authorization Facility

Authorization facility 1722 may be used for associating permissions with a user to specify which portions of an application a user is authorized to use and which portions of the application the user is not authorized to use. The authorization facility is preferably integrated directly into a Web application and used to associate required permissions that are needed to enter certain Web conversations. A user attempting to enter a Web conversation without the requisite permissions could be denied access to the Web conversation. Advantageously, the authorization facility can associate requisite permissions at many levels of detail ranging from specific fine-grained parts of an application through larger views of the application. The authorization facility may allow for declaratively associating, through a configuration approach, a required permission to enter a conversation (or a particular page within a conversation) within a Web application. Advantageously, these associated requisite permissions can be modified by changing declarative definitions. These declarative definitions can be implemented in XML or any other suitable format. The need to edit, compile, and re-build Java code in order to change authorization permissions for the application and/or various parts of the application can, therefore, be avoided, thereby facilitating maintenance and/or modification of the authorization permissions.

Figure 20:
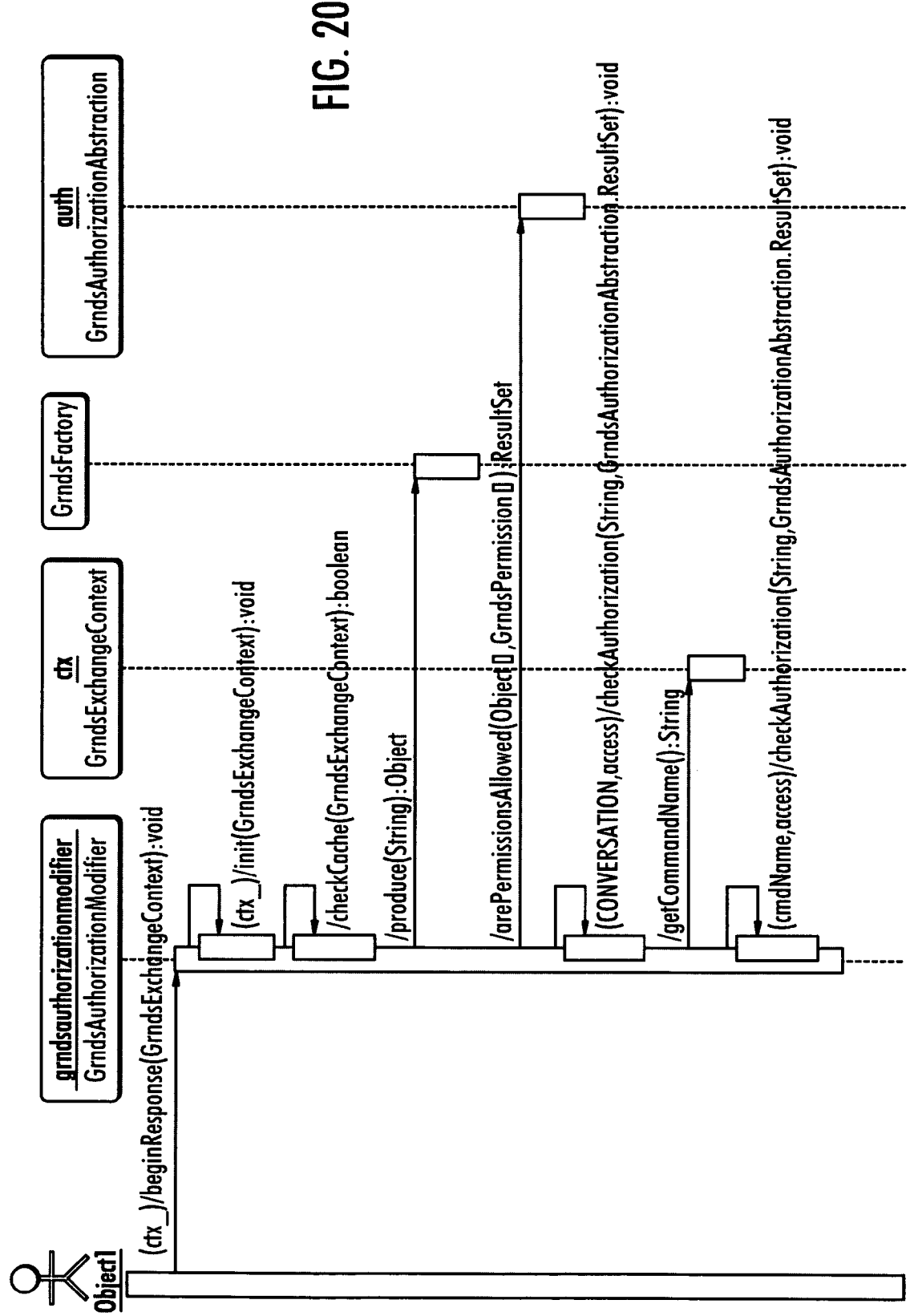
FIGS. 20 and 21 are UML dynamic sequence diagrams showing exemplary steps performed by an authorization modifier in accordance with a detailed illustrative embodiment of the invention.

Referring to FIG. 19, plug-in point 1900 is the point at which the Web application authorization integration UML dynamic sequence diagram of FIG. 20 plugs into the steps shown in FIG. 19.

Figure 21:
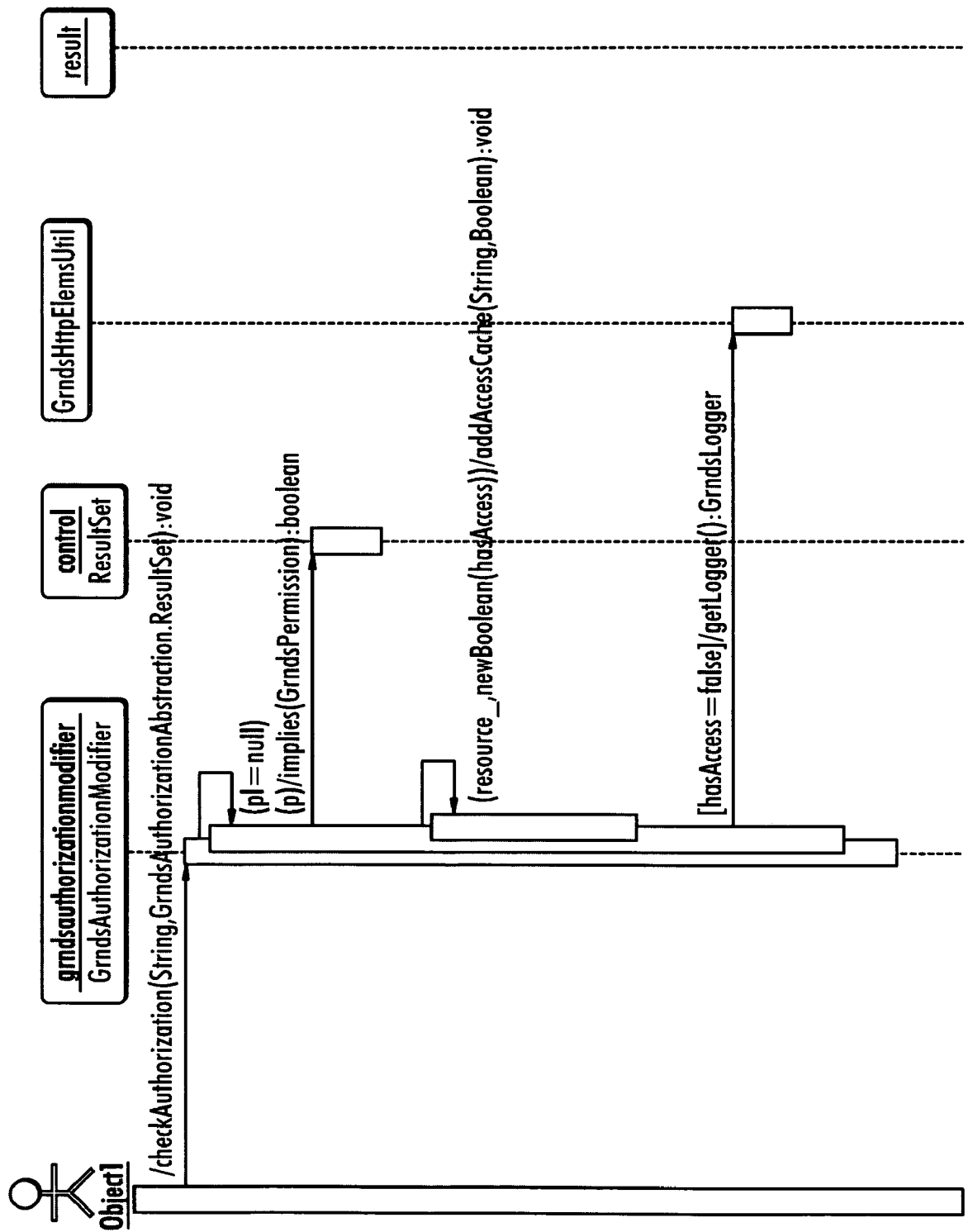

FIGS. 20 and 21 are UML dynamic sequence diagrams showing exemplary steps performed by the beginResponse and checkAuthorization operations of an authorization modifier in accordance with a detailed illustrative embodiment of the invention.

XIV. Variations and Permutations

While the invention has been described with respect to specific examples including presently preferred modes of carrying out the invention, those skilled in the art will appreciate that there are numerous variations and permutations of the above described architecture and techniques that fall within the spirit and scope of the invention as set forth in the appended claims and their equivalents.

I claim:

1. A computer readable storage medium operable to store computer executable instructions for a pipeline architecture for defining a model view controller-like framework in a message oriented middleware-type context, the computer readable medium comprising:

a plurality of activities specifying how a pipeline processing component should handle a particular type of message or message sub-element, each of the activities being a specific task executed to process the particular type of message, or to process the message sub-element of the particular type of message;

an activity plan comprising a subset of the plurality of activities, the activity plan assembled together to define how a received message having message sub elements should be processed; and a selector framework defining at least one logical selector expression comprising a variable and an operator, the at least one logical selector expression specifying at least one condition upon which to selectively filter the plurality of activities included in the activity plan such that less than all of the plurality of activities included in the activity plan are assembled by the selector framework into a series of tasks forming a cohesive process, the activities included in the cohesive process executed with the selector framework to address a particular message related circumstance by application of the series of tasks to at least one of the received message and the message sub-elements.

2. The computer readable storage medium of claim 1 wherein the activities included in the activity plan are configured to be selectively assembled into any one of a plurality of sections, each of which include an assembled series of activities, the plurality of sections selected from the group consisting of: a redelivered message section, a message processing section, a message element section, an output section, a message error handling section, and a message element error handling section.

3. The computer readable storage medium of claim 1 wherein the selector framework provides a mechanism for specifying a plurality of variables of different types that are used within a plurality of selector expressions thereby making the selector framework customizable to assemble less than all of the plurality of activities included in the activity plan into a number of different series of tasks forming respective different cohesive processes used in a plurality of contexts.

4. The computer readable storage medium of claim 1 wherein the at least one logical selector expression is expressed using standard query language.

5. The computer readable storage medium of claim 1 wherein the activity plan is assembled to include a message element section comprising a series of activities that are executed on individual message sub elements, the series of activities executed for each of the individual message sub elements applied based on the logical selector expression.

6. The computer readable storage medium of claim 1 wherein the activity plan is selectively filtered to assemble any of a plurality of different sections, each of the different sections including a series of activities performed on a received message, wherein a first section includes activities performed on the received message as a whole, and a second section includes activities performed on the message sub-elements.

7. The computer readable storage medium of claim 1 wherein the at least one logical selector expression is at least one first logical selector expression comprising a first variable and a first operator, and the cohesive process is a first cohesive process, and the computer readable medium further comprises the selector framework defining at least one second logical selector expression comprising a second variable and a second operator, the at least one second logical selector expression specifying a condition upon which to selectively filter the plurality of activities included in the activity plan such that less than all of the plurality of activities in the activity plan are assembled by the selector framework into a second cohesive process.

8. The computer readable storage medium of claim 1 further comprising an activity plan producer executable to produce the activity plan from an XML source file external to the pipeline architecture.

9. A method of defining a model view controller-like framework in a message oriented middleware-type context, the method comprising:

receiving a message with a server computer executing destination code included in a message oriented middleware application;

retrieving with the server computer an activity plan that includes a plurality of activities, wherein the activity plan is associated with the message oriented middleware application;

the server computer applying a first selector expression comprising a first variable and a first operator to the activity plan to identify a first subset of the activities included in the activity plan, the first selector expression associated with the received message or a state of the message oriented middleware application;

the server computer assembling the first subset of activities into a first series of tasks forming a first cohesive process and executing the identified first subset of activities as the first series of tasks to process the received message;

the server computer applying a second selector expression comprising a second variable and a second operator to the activities in the activity plan to identify a second subset of the activities in the activity plan;

the server computer assembling the second subset of activities into a second series of tasks forming a second cohesive process and executing the identified second subset of activities as the second series of tasks to develop an output message based on the results of the processing of the received message with the first series of tasks; and generating the output message with the server computer for receipt by an application.

10. The method of claim 9, wherein retrieving the activity plan further comprises producing the activity plan from an XML document external to the message oriented middleware application.

11. The method of claim 9, wherein the first selector expression comprises a plurality of selector expressions and the method further comprises applying the plurality of selector expressions to the activity plan to identify a plurality of first subsets of activities included in the activity plan, executing at least one of the plurality of first subsets of activities for application to the received message as a whole at a message level, and executing at least one of the plurality of first subsets of activities for application at a message element level to a message sub-element included in the message.

12. The method of claim 9, wherein the server computer applying the first selector expression comprising the first variable and the first operator to the activity plan to identify the first subset of the activities included in the activity plan comprises filtering the activities in the activity plan using the first selector expression to determine activities that should be applied to the received message as a whole and activities that should be applied to a message sub-element included in the message.

13. The method of claim 9, wherein the server computer applying the second selector expression comprising the second variable and the second operator to the activity plan to identify the second subset of the activities included in the activity plan comprises filtering the activities in the activity plan using the second selector expression to determine activities that should be applied to the results of processing the received message with the first series of tasks.

14. The method of claim 9, wherein the first variable comprises a plurality of variables, and the server computer applying the first selector expression comprises retrieving one of the plurality of first variables from the message, and retrieving an other of the plurality of first variables from the message oriented middleware application, the other of the plurality of first variables indicating a context of the message oriented middleware application.

15. The method of claim 9, wherein executing the identified first subset of activities as the first series of tasks and executing the identified second subset of activities as the second series of tasks comprises performing tasks within an application with the first subset of activities and the second subset of activities via an activity interface to the application.

16. The method of claim 9, wherein the first selector expression comprises a plurality of selector expressions and the method further comprises the server computer evaluating the plurality of selector expressions to identify at least one of the selector expressions that applies to the message.

17. The method of claim 16, wherein evaluating the plurality of selector expressions comprises determining whether each one of the selector expressions is true or false based on at least the first variable.

18. The method of claim 9, wherein each of the activities in the activity plan include a specific task executed to process the message, or to process a message sub-element included in the message.

19. A system for defining a model view controller-like framework in a message oriented middleware-type context, the system comprising:

a computer having a memory;

an application stored in the memory and executable on the computer;

a message oriented middleware module stored in the memory and executable on the computer, the message oriented middleware module configured to receive an incoming message;

an activity plan stored in the memory and executable on the computer with the message oriented middleware module, wherein the activity plan includes a plurality of activities that are selectively useable to process the incoming message each of the activities being a specific task executed to process a particular type of message;

a selector facility engine included in the message oriented middleware module and executable on the computer, the selector facility engine configured to evaluate a plurality of selector expressions in view of at least one of a state of the application or information in the incoming message, or combinations thereof, each of the selector expressions comprising a variable and an operator; and an activity selector included in the message oriented middleware module and executable on the computer, the activity selector configured to test for those selector expressions that are applicable to the activities in the activity plan, the activity selector further configured to filter the activity plan using at least one of the applicable selector expressions identified from the test to assemble a subset of the activities from the activity plan as a series of tasks, the activity selector further configured to execute the subset of the activities in the activity plan to process the incoming message.

20. The system of claim 19 further comprising an activity interface executable on the computer, the activity interface being an executable activity operable to interface with the application and perform a task within the application.

21. The system of claim 19 wherein the message oriented middleware module is configurable to allow one system to publish data to a work queue in communication with the computer, and allow a second system in communication with the computer to subscribe to messages that are generated based on the published data, wherein the messages are processed by the message oriented middleware module and output from the message oriented middleware module for receipt by the second system.

22. The system of claim 19 wherein the activity plan includes activities directed to a plurality of different processing components that are selectively assembled into the series of tasks in response to the incoming message, wherein the processing components include a message processing component, an output message production component, an error handling component, and a message redelivery component.

23. The system of claim 19 wherein the activity plan comprises a message section that includes a first series of activities that are selectively assembled and executable on the incoming message as a whole, and a message element section that includes a second series of activities that are selectively assembled and executable on elements included in the incoming message.

24. The system of claim 19 wherein the activity plan comprises an error handling section that includes activities that are selectively assembled and executable on the incoming message as a whole, or on elements included in the incoming message, or combinations thereof.

25. The system of claim 19 wherein the activity plan comprises an output section that includes activities that are selectively assembled and executable to produce an output message in response to processing of the incoming message.

26. The system of claim 19 wherein the selector facility engine is operable to evaluate the value identifier in a predefined context specific way as part of the test based on a context provided by the message oriented middleware module.

* * * * *